US012772213B2

(12) United States Patent
Liu et al.

(10) Patent No.: US 12,772,213 B2
(45) Date of Patent: Oct. 20, 2026

(54) METHOD AND DEVICE IN NODES USED FOR WIRELESS COMMUNICATION

(71) Applicant: BUNKER HILL TECHNOLOGIES LLC, Allen, TX (US)

(72) Inventors: Jin Liu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 669 days.

(21) Appl. No.: 18/140,624

(22) Filed: Apr. 28, 2023

(65) Prior Publication Data

US 2023/0269708 A1 Aug. 24, 2023

Related U.S. Application Data

(63) Continuation of application No. PCT/CN2021/134696, filed on Dec. 1, 2021.

(30) Foreign Application Priority Data

Dec. 2, 2020 (CN) ........................ 202011389301.X

(51) Int. Cl.
*H04W 72/044* (2023.01)
*H04W 72/40* (2023.01)
*H04W 72/542* (2023.01)

(52) U.S. Cl.
CPC ....... *H04W 72/044* (2013.01); *H04W 72/542* (2023.01); *H04W 72/40* (2023.01)

(58) Field of Classification Search
CPC .. H04W 72/044; H04W 72/40; H04W 72/542
See application file for complete search history.

(56) References Cited

U.S. PATENT DOCUMENTS

2019/0327732 A1 10/2019 Yoon
2022/0150730 A1* 5/2022 Freda .................... H04L 1/1812

(Continued)

FOREIGN PATENT DOCUMENTS

CN 107666377 A 2/2018
CN 110932832 A 3/2020

(Continued)

OTHER PUBLICATIONS

First Office Action of Chinese patent application No. CN202011389301.X dated Nov. 1, 2023.

(Continued)

*Primary Examiner* — Brian P Cox
(74) *Attorney, Agent, or Firm* — Ascenda Law Group, PC

(57) ABSTRACT

A first node receives a first signaling; performs a first channel sensing in a first resource pool; and determines a target resource pool; and selects a target time-frequency resource block in the target resource pool; and transmits a second signaling on the target time-frequency resource block; the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block. This application makes full use of inter-user coordinated resources so that the freedom degree of resource selection can be guaranteed.

20 Claims, 4 Drawing Sheets

(56) References Cited

U.S. PATENT DOCUMENTS

| | | | | |
|---|---|---|---|---|
| 2022/0312422 | A1* | 9/2022 | Lee | H04W 72/02 |
| 2023/0413234 | A1* | 12/2023 | Zhao | H04W 72/044 |

FOREIGN PATENT DOCUMENTS

| | | | |
|---|---|---|---|
| CN | 111918398 | A | 11/2020 |
| CN | 111988757 | A | 11/2020 |
| WO | 2020233405 | A1 | 11/2020 |

OTHER PUBLICATIONS

First Search Report of Chinese patent application No. CN202011389301.X dated Oct. 30, 2023.

ISR received in application No. PCT/CN2021/134696 dated Feb. 28, 2022.

* cited by examiner

METHOD AND DEVICE IN NODES USED FOR WIRELESS COMMUNICATION

CROSS REFERENCE TO RELATED APPLICATIONS

This application is the continuation of the international patent application PCT/CN2021/134696, filed on Dec. 1, 2021, and claims the priority benefit of Chinese Patent Application No. 202011389301.X, filed on Dec. 2, 2020, the full disclosure of which is incorporated herein by reference.

BACKGROUND

Technical Field

The present application relates to transmission methods and devices in wireless communication systems, and in particular to a sidelink-related transmission scheme and device in wireless communications.

Related Art

Since Long Term Evolution (LTE) the 3rd Generation Partner Project (3GPP) has started developing the Sidelink (SL) as a means of direct communications between users, and has accomplished in Release-16 (Rel-16) the first New Radio Sidelink (NR SL) standard for "5G V2X with NR Sidelink". In Rel-16, the NR SL is mainly designed for Vehicle-To-Everything (V2X), but is also applicable to Public Safety.

Due to the time limit, the NR SL Rel-16 cannot provide full support to service requirements and working conditions recognized for 5G V2X by the 3GPP. Therefore, the 3GPP will study Enhanced NR SL in Rel-17.

SUMMARY

In the Rel-16 system, a User Equipment (UE) itself selects resources for the sake of a distributed system of NR SL, and the issue involving Half-Duplex (namely, the UE cannot receive and transmit simultaneously) or a hidden node (i.e., Hidden UE) will easily lead to a result that two transmitting users occupy the same SL resource for transmitting signals to a same receiving user, thus causing constant interferences and resource collisions between users. Introducing Inter-UE coordination is a feasible way of dealing with collisions between inter-user resources. But how to make use of inter-user coordination in an effective manner and guarantee the request for the degree of freedom in resource selection still needs further study.

To address the above problem, the present application discloses a method of resource selection with the introduction of SL inter-user coordination, making good use of inter-user coordinated resources to solve the issue concerning Half-Duplex and hidden nodes. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict. Furthermore, though originally targeted at SL, the present application also applies to Uplink (UL). Furthermore, though originally targeted at single-carrier communications, the present application also applies to multi-carrier communications. Furthermore, though originally targeted at single-antenna communications, the present application also applies to multi-antenna communications. Furthermore, the present application is designed targeting V2X scenario, but can be extended to terminal-base station communications, terminal-relay communications, as well as relay-base station communications, where similar technical effects can be achieved. Additionally, the adoption of a unified solution for various scenarios, including but not limited to V2X and terminal-base station communications, contributes to the reduction of hardcore complexity and costs.

In one embodiment, interpretations of the terminology in the present application refer to definitions given in the 3GPP TS36 series, TS37 series and TS38 series, but also can refer to definitions given in Institute of Electrical and Electronics Engineers (IEEE) protocol specifications.

The present application provides a method in a first node for wireless communications, comprising:

receiving a first signaling; performing a first channel sensing in a first resource pool; and determining a target resource pool; and selecting a target time-frequency resource block in the target resource pool; and transmitting a second signaling on the target time-frequency resource block;

herein, the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

In one embodiment, a problem to be solved in the present application is: the issue of limited freedom degree of resource selection of users resulting from inter-user resource coordination.

In one embodiment, the method provided in the present application is: to establish association between inter-user coordinated resources and resource selection.

In one embodiment, the method provided in the present application is: to establish association between inter-user coordinated resources and a target time-frequency resource block.

In one embodiment, the above method is characterized in that when a channel resource being sensed belongs to inter-user coordinated resources, the channel resource is more likely to be chosen as a resource to be transmitted.

In one embodiment, the above method is advantageous in that on the condition of guaranteeing a full use of inter-user coordinated resources, the present application ensures the freedom degree of the user's autonomous resource selection, thus effectively addressing the issue of hidden nodes in a distributed system.

According to one aspect of the present application, the above method is characterized in that the first candidate time-frequency resource block is associated with a first time-frequency resource block; the first resource pool comprises the first time-frequency resource block; a measurement value for the first time-frequency resource block and whether the first candidate time-frequency resource block belongs to the first reference resource set are used together to determine whether the first candidate time-frequency resource block is chosen as the target time-frequency resource block.

According to one aspect of the present application, the above method is characterized in comprising:

receiving a third signaling;

herein, the third signaling indicates a second resource pool, the second resource pool comprising a third time-frequency resource block, a third candidate time-frequency resource block being associated with the third time-frequency resource block; the second resource pool is used to determine the first resource pool, the first resource pool not comprising the third time-frequency resource block; the first signaling is used to determine whether the third candidate time-frequency resource block belongs to the target resource pool.

According to one aspect of the present application, the above method is characterized in that the first resource pool comprises a fourth time-frequency resource block, a fourth candidate time-frequency resource block being associated with the fourth time-frequency resource block; a measurement value for the fourth time-frequency resource block is higher than a first threshold; the first signaling and a first offset value are used together to determine whether the fourth candidate time-frequency resource block belongs to the target resource pool.

According to one aspect of the present application, the above method is characterized in that the first node is a UE.

According to one aspect of the present application, the above method is characterized in that the first node is a relay node.

According to one aspect of the present application, the above method is characterized in that the first node is a base station.

The present application provides a method in a second node for wireless communications, comprising:

transmitting a first signaling; and receiving a second signaling on a target time-frequency resource block;

herein, the first signaling is used to indicate a first reference resource set, the first reference resource set comprising at least one time-frequency resource block; whether the first reference resource set comprises a first candidate time-frequency resource block is used by a receiver receiving the first signaling to determine whether the first candidate time-frequency resource block is chosen as the target time-frequency resource block; the second signaling indicates the target time-frequency resource block.

According to one aspect of the present application, the above method is characterized in that the second node is a UE.

According to one aspect of the present application, the above method is characterized in that the second node is a relay node.

According to one aspect of the present application, the above method is characterized in that the second node is a base station.

The present application provides a method in a third node for wireless communications, comprising:

transmitting a third signaling;

herein, the third signaling is used to indicate a second resource pool, the second resource pool being used by a receiver receiving the third signaling to determine a first resource pool; the second resource pool comprises a third time-frequency resource block, the first resource pool not comprising the third time-frequency resource block.

According to one aspect of the present application, the above method is characterized in that the third node is a base station.

According to one aspect of the present application, the above method is characterized in that the third node is a relay node.

According to one aspect of the present application, the above method is characterized in that the third node is a UE.

The present application provides a first node for wireless communications, comprising:

a first receiver, receiving a first signaling; and performing a first channel sensing in a first resource pool; and determining a target resource pool; and a first transmitter, selecting a target time-frequency resource block in the target resource pool; and transmitting a second signaling on the target time-frequency resource block;

herein, the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

The present application provides a second node for wireless communications, comprising:

a second transmitter, transmitting a first signaling; and a second receiver, receiving a second signaling on a target time-frequency resource block;

herein, the first signaling is used to indicate a first reference resource set, the first reference resource set comprising at least one time-frequency resource block; whether the first reference resource set comprises a first candidate time-frequency resource block is used by a receiver receiving the first signaling to determine whether the first candidate time-frequency resource block is chosen as the target time-frequency resource block; the second signaling indicates the target time-frequency resource block.

The present application provides a third node for wireless communications, comprising:

a third transmitter, transmitting a third signaling;

herein, the third signaling is used to indicate a second resource pool, the second resource pool being used by a receiver receiving the third signaling to determine a first resource pool; the second resource pool comprises a third time-frequency resource block, the first resource pool not comprising the third time-frequency resource block.

In one embodiment, the present application has the following advantages:

an issue to be addressed in the present application is: the issue of limited freedom degree of resource selection of users resulting from inter-user resource coordination.

the present application sets up association between inter-user coordinated resources and resource selection.

the method in the present application sets up association between inter-user coordinated resources and a target time-frequency resource block.

in the present application, when a channel resource being sensed belongs to inter-user coordinated resources, the channel resource is more likely to be chosen as a resource to be transmitted;

on the condition of guaranteeing a full use of inter-user coordinated resources, the present application ensures the freedom degree of the user's autonomous resource selection, thus effectively addressing the issue of hidden nodes in a distributed system.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
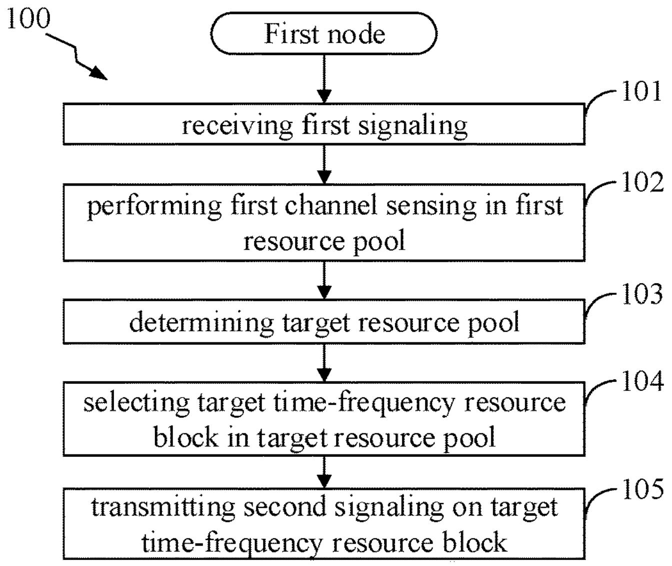
FIG. 1 illustrates a flowchart of processing of a first node according to one embodiment of the present application.

Embodiment 1 illustrates a flowchart of processing of a first node in one embodiment of the present application, as shown in FIG. 1. In FIG. 1, each box represents a step.

In Embodiment 1, the first node in the present application firstly performs step 101 to receive a first signaling; and performs step 102 to perform a first channel sensing in a first resource pool; and then performs step 103 to determine a target resource pool; and performs step 104 to select a target time-frequency resource block in the target resource pool; and finally performs step 105 to transmit a second signaling on a target time-frequency resource block; the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

In one embodiment, the first reference resource set comprises multiple Resource Elements (REs).

In one embodiment, any RE among the multiple REs comprised in the first reference resource set occupies one multicarrier symbol in time domain and one subcarrier in frequency domain.

In one embodiment, the first reference resource set comprises a positive integer number of time-domain resource block(s) in time domain, and the first reference resource set comprises a positive integer number of frequency-domain resource block(s) in frequency domain.

In one embodiment, any time-domain resource block of the positive integer number of time-domain resource block(s) comprised in the first reference resource set in time domain occupies a positive integer number of multicarrier symbol(s).

In one embodiment, any time-domain resource block of the positive integer number of time-domain resource block(s) comprised in the first reference resource set in time domain occupies a positive integer number of slot(s).

In one embodiment, any frequency-domain resource block of the positive integer number of frequency-domain resource block(s) comprised in the first reference resource set in frequency domain occupies a positive integer number of subcarrier(s).

In one embodiment, any frequency-domain resource block of the positive integer number of frequency-domain resource block(s) comprised in the first reference resource set in frequency domain occupies a positive integer number of Physical Resource Block(s) (PRB(s)).

In one embodiment, any frequency-domain resource block of the positive integer number of frequency-domain resource block(s) comprised in the first reference resource set in frequency domain occupies a positive integer number of subchannel(s).

In one embodiment, the first reference resource set comprises a positive integer number of time-frequency resource block(s).

In one embodiment, the first reference resource set comprises at least one time-frequency resource block.

In one embodiment, the first reference resource set comprises one time-frequency resource block.

In one embodiment, the first reference resource set comprises multiple time-frequency resource blocks.

In one embodiment, any time-frequency resource block of the positive integer number of time-frequency resource block(s) comprised in the first reference resource set occupies a positive integer number of slot(s) in time domain and occupies a positive integer number of subchannel(s) in frequency domain.

In one embodiment, any time-frequency resource block of the positive integer number of time-frequency resource block(s) comprised in the first reference resource set occupies a positive integer number of multicarrier symbol(s) in time domain and occupies a positive integer number of subchannel(s) in frequency domain.

In one embodiment, any time-frequency resource block of the positive integer number of time-frequency resource block(s) comprised in the first reference resource set occupies a positive integer number of slot(s) in time domain and occupies a positive integer number of Physical Resource Block(s) (PRB(s)) in frequency domain.

In one embodiment, any time-frequency resource block of the positive integer number of time-frequency resource block(s) comprised in the first reference resource set occupies a positive integer number of multicarrier symbol(s) in time domain and occupies a positive integer number of Physical Resource Block(s) (PRB(s)) in frequency domain.

In one embodiment, any time-frequency resource block of the positive integer number of time-frequency resource block(s) comprised in the first reference resource set comprises a positive integer number of RE(s).

In one embodiment, the first reference resource set comprises a Physical Sidelink Control Channel (PSCCH).

In one embodiment, the first reference resource set comprises a Physical Sidelink Shared Channel (PSSCH).

In one embodiment, the first reference resource set comprises a Physical Sidelink Feedback Channel (PSFCH).

In one embodiment, the first reference resource set is used for transmitting a Sidelink Reference Signal (SL RS).

In one embodiment, the SL RS comprises a Sidelink Channel State Information Reference Signal (SL CSI-RS).

In one embodiment, the SL RS comprises a PSCCH Demodulation Reference Signal (DMRS).

In one embodiment, the SL RS comprises a PSSCH DMRS.

In one embodiment, the first reference resource set is obtained through channel sensing by a transmitter transmitting the first signaling.

In one embodiment, the first reference resource set is time-frequency resources recommended by a transmitter transmitting the first signaling to the first node for transmitting.

In one embodiment, the first reference resource set is time-frequency resources indicated by a transmitter transmitting the first signaling for transmitting the second signaling.

In one embodiment, the first signaling comprises one or more fields in a Physical Layer (PHY) signaling.

In one embodiment, the first signaling comprises one or more fields in a piece of Sidelink Control Information (SCI).

In one embodiment, the first signaling comprises an SCI.

In one embodiment, the first signaling comprises at least one of multiple fields in a first-class SCI format and at least one of multiple fields in a second-class SCI format.

In one embodiment, the first signaling comprises all or part of a Higher Layer Signaling.

In one embodiment, the first signaling comprises all or part of a Radio Resource Control (RRC) layer signaling.

In one embodiment, the first signaling comprises all or part of a PC5-RRC signaling.

In one embodiment, the first signaling comprises all or part of a Multimedia Access Control (MAC) layer signaling.

In one embodiment, a channel occupied by the first signaling includes a PSCCH.

In one embodiment, a channel occupied by the first signaling includes a PSSCH.

In one embodiment, the first signaling indicates time-domain resources occupied by the first reference resource set.

In one embodiment, the first signaling indicates frequency-domain resources occupied by the first reference resource set.

In one embodiment, the first signaling indicates time-frequency resources occupied by the first reference resource set.

In one embodiment, the first signaling indicates the positive integer number of time-domain resource block(s) comprised in the first reference resource set.

In one embodiment, the first signaling indicates the positive integer number of frequency-domain resource block(s) comprised in the first reference resource set.

In one embodiment, the first signaling indicates the positive integer number of time-frequency resource block(s) comprised in the first reference resource set.

In one embodiment, the first resource pool is used for Sidelink (SL) transmission.

In one embodiment, the first resource pool comprises all or partial resources in an SL Resource Pool.

In one embodiment, the first resource pool comprises all or partial resources in an SL Transmission Resource Pool.

In one embodiment, the first resource pool comprises all or partial resources in an SL Reception Resource Pool.

In one embodiment, the first resource pool comprises a PSCCH.

In one embodiment, the first resource pool comprises a PSSCH.

In one embodiment, the first resource pool comprises a PSFCH.

In one embodiment, the first resource pool is used for transmitting an SL RS.

In one embodiment, the first resource pool is comprised of multiple REs.

In one embodiment, any RE among the multiple REs comprised by the first resource pool occupies one multicarrier symbol in time domain, and one subcarrier in frequency domain.

In one embodiment, the first resource pool comprises multiple time-domain resource blocks in time domain, and comprises multiple frequency-domain resource blocks in frequency domain.

In one embodiment, any time-domain resource block among the multiple time-domain resource blocks comprised in the first resource pool in time domain comprises a positive integer number of multicarrier symbol(s).

In one embodiment, any time-domain resource block among the multiple time-domain resource blocks comprised in the first resource pool in time domain comprises a positive integer number of slot(s).

In one embodiment, any frequency-domain resource block among the multiple frequency-domain resource blocks comprised in the first resource pool in frequency domain comprises a positive integer number of subcarrier(s).

In one embodiment, any frequency-domain resource block among the multiple frequency-domain resource blocks comprised in the first resource pool in frequency domain comprises a positive integer number of physical resource block(s) (PRB(s)).

In one embodiment, any frequency-domain resource block among the multiple frequency-domain resource blocks comprised in the first resource pool in frequency domain comprises a positive integer number of subchannel(s).

In one embodiment, the first resource pool comprises multiple time-frequency resource blocks.

In one embodiment, any time-frequency resource block among the multiple time-frequency resource blocks comprised in the first resource pool occupies a positive integer number of slot(s) in time domain and occupies a positive integer number of consecutive subchannels in frequency domain.

In one embodiment, any time-frequency resource block among the multiple time-frequency resource blocks comprised in the first resource pool occupies a positive integer number of multicarrier symbol(s) in time domain and occupies a positive integer number of consecutive subchannels in frequency domain.

In one embodiment, any time-frequency resource block among the multiple time-frequency resource blocks comprised in the first resource pool occupies a positive integer number of slot(s) in time domain and occupies a positive integer number of consecutive PRBs in frequency domain.

In one embodiment, any time-frequency resource block among the multiple time-frequency resource blocks comprised in the first resource pool occupies a positive integer number of multicarrier symbol(s) in time domain and occupies a positive integer number of consecutive PRBs in frequency domain.

In one embodiment, any time-frequency resource block among the multiple time-frequency resource blocks comprised in the first resource pool comprises a positive integer number of RE(s).

In one embodiment, the multiple time-domain resources comprised in the first resource pool in time domain are pre-configured.

In one embodiment, the multiple time-domain resources comprised in the first resource pool in time domain are configured by a higher-layer signaling.

In one embodiment, the target resource pool is used for sidelink transmission.

In one embodiment, the target resource pool comprises all or partial resources in a sidelink resource pool.

In one embodiment, the target resource pool comprises all or partial resources in a sidelink transmission resource pool.

In one embodiment, the target resource pool comprises all or partial resources in a sidelink reception resource pool.

In one embodiment, the target resource pool comprises a PSCCH.

In one embodiment, the target resource pool comprises a PSSCH.

In one embodiment, the target resource pool comprises a PSFCH.

In one embodiment, the target resource pool is used for transmitting an SL RS.

In one embodiment, the target resource pool is comprised of multiple REs.

In one embodiment, the target resource pool comprises multiple time-domain resource blocks in time domain, and comprises multiple frequency-domain resource blocks in frequency domain.

In one embodiment, any time-domain resource block among the multiple time-domain resource blocks comprised in the target resource pool in time domain comprises a positive integer number of multicarrier symbol(s).

In one embodiment, any time-domain resource block among the multiple time-domain resource blocks comprised in the target resource pool in time domain comprises a positive integer number of slot(s).

In one embodiment, any frequency-domain resource block among the multiple frequency-domain resource blocks comprised in the target resource pool in frequency domain comprises a positive integer number of subcarrier(s).

In one embodiment, any frequency-domain resource block among the multiple frequency-domain resource blocks comprised in the target resource pool in frequency domain comprises a positive integer number of physical resource block(s) (PRB(s)).

In one embodiment, any frequency-domain resource block among the multiple frequency-domain resource blocks comprised in the target resource pool in frequency domain comprises a positive integer number of subchannel(s).

In one embodiment, the target resource pool comprises multiple time-frequency resource blocks.

In one embodiment, any time-frequency resource block among the multiple time-frequency resource blocks comprised in the target resource pool occupies a positive integer number of slot(s) in time domain and occupies a positive integer number of consecutive subchannels in frequency domain.

In one embodiment, any time-frequency resource block among the multiple time-frequency resource blocks comprised in the target resource pool occupies a positive integer number of multicarrier symbol(s) in time domain and occupies a positive integer number of subchannel(s) in frequency domain.

In one embodiment, any time-frequency resource block among the multiple time-frequency resource blocks comprised in the target resource pool occupies a positive integer number of slot(s) in time domain and occupies a positive integer number of consecutive PRBs in frequency domain.

In one embodiment, any time-frequency resource block among the multiple time-frequency resource blocks comprised in the target resource pool occupies a positive integer number of multicarrier symbol(s) in time domain and occupies a positive integer number of consecutive PRBs in frequency domain.

In one embodiment, any time-frequency resource block among the multiple time-frequency resource blocks comprised in the target resource pool comprises a positive integer number of RE(s).

In one embodiment, the target resource pool comprises multiple time-frequency resource blocks, where the first candidate time-frequency resource block is one of the multiple time-frequency resource blocks comprised in the target resource pool.

In one embodiment, any time-frequency resource block among the multiple time-frequency resource blocks comprised in the target resource pool is associated with a time-frequency resource block in the first resource pool.

In one embodiment, a time-frequency resource block among the multiple time-frequency resource blocks comprised in the target resource pool is not associated with a time-frequency resource block in the first resource pool.

In one embodiment, a time-frequency resource block among the multiple time-frequency resource blocks comprised in the target resource pool is associated with a time-frequency resource block in a second resource pool in the present application.

In one embodiment, a time-frequency resource block among the multiple time-frequency resource blocks comprised in the target resource pool is associated with a time-frequency resource block in a second resource pool in the present application, the first resource pool not comprising the time-frequency resource block in the second resource pool in the present application.

In one embodiment, the target resource pool and the first resource pool are Time Division Multiplexing (TDM).

In one embodiment, the target resource pool and the first resource pool are orthogonal in time domain.

In one embodiment, the first resource pool and the target resource pool are non-overlapping in time domain.

In one embodiment, any time-domain resource block among the multiple time-domain resource blocks comprised in the first resource pool is different from any time-domain resource block among the multiple time-domain resource blocks comprised in the target resource pool.

In one embodiment, time-domain resources occupied by the target resource pool and time-domain resources occupied by the first resource pool are orthogonal.

In one embodiment, any time-frequency resource block in the target resource pool and any time-frequency resource block in the first resource pool are TDM.

In one embodiment, the target resource pool is later than the first resource pool in time domain.

In one embodiment, time-domain resources occupied by any time-frequency resource block in the first resource pool are earlier than time-domain resources occupied by any time-frequency resource block in the target resource pool.

In one embodiment, any time-domain resource block in the first resource pool is earlier than any time-domain resource block in the target resource block.

In one embodiment, the target resource pool and the first resource pool are overlapping in frequency domain.

In one embodiment, at least one frequency-domain resource block among the multiple frequency-domain resource blocks comprised in the target resource pool is the same as a frequency-domain resource block among the multiple frequency-domain resource blocks comprised in the first resource pool.

In one embodiment, at least one frequency-domain resource block among the multiple frequency-domain resource blocks comprised in the target resource pool is different from a frequency-domain resource block among the multiple frequency-domain resource blocks comprised in the first resource pool.

In one embodiment, the target resource pool comprises the first candidate time-frequency resource block.

In one embodiment, the first candidate time-frequency resource block belongs to the target resource pool.

In one embodiment, the first candidate time-frequency resource block is one of the multiple time-frequency resource blocks comprised in the target resource pool.

In one embodiment, the first reference resource set comprises the first candidate time-frequency resource block.

In one embodiment, the first candidate time-frequency resource block belongs to the first reference resource set.

In one embodiment, the first candidate time-frequency resource block is one of the positive integer number of time-frequency resource block(s) comprised in the first reference resource set.

In one embodiment, the first reference resource set does not comprise the first candidate time-frequency resource block.

In one embodiment, the first candidate time-frequency resource block does not belong to the first reference resource set.

In one embodiment, the first candidate time-frequency resource block is different from any time-frequency resource block of the positive integer number of time-frequency resource block(s) comprised in the first reference resource set.

In one embodiment, the target resource pool comprises the target time-frequency resource block.

In one embodiment, the target time-frequency resource block is one of the multiple time-frequency resource blocks comprised in the target resource pool.

In one embodiment, the target time-frequency resource block comprises a PSCCH.

In one embodiment, the target time-frequency resource block comprises a PSSCH.

In one embodiment, the target time-frequency resource block comprises a PSFCH.

In one embodiment, the target time-frequency resource block is used for transmitting the second signaling.

In one embodiment, the first node itself selects the target time-frequency resource block in the target resource pool.

In one embodiment, the first node itself chooses the first candidate time-frequency resource block as the target time-frequency resource block in the target resource pool.

In one embodiment, the target time-frequency resource block is selected by the first node itself from the target resource pool.

In one embodiment, the target time-frequency resource block is indicated to the first node, the target time-frequency resource block belonging to the target resource pool.

In one embodiment, the first candidate time-frequency resource block is indicated to the first node as the target time-frequency resource block, the first candidate time-frequency resource block belonging to the target resource pool.

In one embodiment, time-domain resources occupied by the first candidate time-frequency resource block comprise an earliest time-domain resource block in time domain among the multiple time-domain resource blocks comprised in the target resource pool, where the first candidate time-frequency resource block is chosen as the target time-frequency resource block.

In one embodiment, the first reference resource set comprises the target time-frequency resource block.

In one embodiment, the target time-frequency resource block belongs to the first reference resource set, and the target time-frequency resource block also belongs to the target resource pool.

In one embodiment, the target time-frequency resource block is one of the positive integer number of time-frequency resource block(s) comprised in the first reference resource set, and the target time-frequency resource block is one of the multiple time-frequency resource blocks comprised in the target resource pool.

In one embodiment, when the first candidate time-frequency resource block is one of the positive integer number of time-frequency resource block(s) comprised in the first reference resource set, the first candidate time-frequency resource block is chosen as the target time-frequency resource block; when the first candidate time-frequency resource block is different from any of the positive integer number of time-frequency resource block(s) comprised in the first reference resource set, the first candidate time-frequency resource block is not chosen as the target time-frequency resource block.

In one embodiment, the target resource pool comprises a first candidate time-frequency resource block and a second candidate time-frequency resource block, the first candidate time-frequency resource block belonging to the first reference resource set, while the second candidate time-frequency resource block not belonging to the first reference resource set, where a former one of the first candidate time-frequency resource block or the second candidate time-frequency resource block is chosen as the target time-frequency resource block.

In one embodiment, the target resource pool comprises a first candidate time-frequency resource block and a second candidate time-frequency resource block, the first candidate time-frequency resource block belonging to the first reference resource set, and the second candidate time-frequency resource block belonging to the first reference resource set, where the first candidate time-frequency resource block is not chosen as the target time-frequency resource block.

In one embodiment, the target resource pool comprises a first candidate time-frequency resource block and a second candidate time-frequency resource block, the first candidate time-frequency resource block belonging to the first reference resource set, and the second candidate time-frequency resource block belonging to the first reference resource set, where one of the first candidate time-frequency resource block or the second candidate time-frequency resource block is chosen as the target time-frequency resource block.

In one embodiment, the target resource pool comprises a first candidate time-frequency resource block and a second candidate time-frequency resource block, the first candidate time-frequency resource block and the second candidate time-frequency resource block both belonging to the first reference resource set, the target time-frequency resource block is selected from the first candidate time-frequency resource block or the second candidate time-frequency resource block, and the target time-frequency resource block is the first candidate time-frequency resource block.

In one subembodiment, time-domain resources occupied by the first candidate time-frequency resource block are earlier than time-domain resources occupied by the second candidate time-frequency resource block.

In one subembodiment, the first candidate time-frequency resource block is associated with a first time-frequency resource block, while the second candidate time-frequency resource block is associated with a second time-frequency resource block, where both the first time-frequency resource block and the second time-frequency resource block belong to the first resource pool; a first reference signal is transmitted on the first time-frequency resource block, while a second reference signal is transmitted on the second time-frequency resource block, where a Reference Signal Received Power (RSRP) of the first reference signal measured on the first time-frequency resource block is lower than an RSRP of the second reference signal measured on the second time-frequency resource block.

In one subembodiment, the first candidate time-frequency resource block is associated with a first time-frequency resource block, while the second candidate time-frequency resource block is associated with a second time-frequency resource block, where both the first time-frequency resource block and the second time-frequency resource block belong to the first resource pool; a first reference signal is transmitted on the first time-frequency resource block, while a second reference signal is transmitted on the second time-frequency resource block, where a Received Signal Strength Indicator (RSSI) of the first reference signal measured on the first time-frequency resource block is lower than an RSSI of the second reference signal measured on the second time-frequency resource block.

In one embodiment, the target resource pool comprises a first candidate time-frequency resource block and a second candidate time-frequency resource block, when the first candidate time-frequency resource block belongs to the first reference resource set, while the second candidate time-frequency resource block does not belong to the first reference resource set, the first candidate time-frequency resource block is chosen as the target time-frequency resource block; when the first candidate time-frequency resource block does not belong to the first reference resource set, while the second candidate time-frequency resource block belongs to the first reference resource set, the first candidate time-frequency resource block is not chosen as the target time-frequency resource block; when the first candidate time-frequency resource block belongs to the first reference resource set, and the second candidate time-frequency resource block belongs to the first reference resource set, one of the first candidate time-frequency resource block or the second candidate time-frequency resource block is chosen as the target time-frequency resource block; when the first candidate time-frequency resource block does not belong to the first reference resource set, and the second candidate time-frequency resource block does not belong to the first reference resource set, the first candidate time-frequency resource block is not chosen as the target time-frequency resource block.

In one embodiment, the first candidate time-frequency resource block and the second candidate time-frequency resource block are two time-frequency resource blocks among the multiple time-frequency resource blocks comprised in the target resource pool.

In one embodiment, the first candidate time-frequency resource block being chosen as the target time-frequency resource block means that the target time-frequency resource block is the first candidate time-frequency resource block.

In one embodiment, the first candidate time-frequency resource block being chosen as the target time-frequency resource block means that the first node chooses the first candidate time-frequency resource block between the first candidate time-frequency resource block and the second candidate time-frequency resource block as the target time-frequency resource block.

In one embodiment, the first candidate time-frequency resource block being chosen as the target time-frequency resource block means that the target time-frequency resource block is a former one of the first candidate time-frequency resource block or the second candidate time-frequency resource block.

In one embodiment, the first candidate time-frequency resource block being chosen as the target time-frequency resource block means that the target time-frequency resource block is the first candidate time-frequency resource block among the multiple time-frequency resource blocks comprised in the target resource pool.

In one embodiment, the second signaling comprises one or more fields in a PHY Layer signaling.

In one embodiment, the second signaling comprises one or more fields in an SCI.

In one embodiment, the second signaling comprises an SCI.

In one embodiment, the second signaling comprises the first-class SCI format between a first-class SCI format and a second-class SCI format.

In one embodiment, the second signaling comprises one or more fields in a first-class SCI format.

In one embodiment, for the definition of SCI, refer to 3GPP TS38.212, Section 8.3 and Section 8.4.

In one embodiment, for the definition of the first-class SCI format, refer to 3GPP TS38.212, Section 8.3.

In one embodiment, for the definition of the second-class SCI format, refer to 3GPP TS38.212, Section 8.4.

In one embodiment, the second signaling comprises all or part of a higher layer signaling.

In one embodiment, the second signaling comprises one or more fields in a PC5-RRC signaling.

In one embodiment, the second signaling comprises all or part of a MAC layer signaling.

In one embodiment, a channel occupied by the second signaling includes a PSCCH.

In one embodiment, a channel occupied by the second signaling includes a PSSCH.

In one embodiment, the second signaling indicates the target time-frequency resource block.

In one embodiment, the second signaling indicates time-domain resources occupied by the target time-frequency resource block.

In one embodiment, the second signaling indicates frequency-domain resources occupied by the target time-frequency resource block.

In one embodiment, the second signaling indicates REs comprised in the target time-frequency resource block.

In one embodiment, the second signaling comprises multiple fields, time-domain resources occupied by the target time-frequency resource block and frequency-domain resources occupied by the target time-frequency resource block respectively being two fields among the multiple fields comprised in the second signaling.

In one embodiment, the second signaling indicates the second priority.

In one embodiment, the second signaling carries the second priority.

In one embodiment, the second signaling comprises multiple fields, where the second priority is one of the multiple fields comprised in the second signaling.

In one embodiment, the second signaling comprises a first sub-signaling and a second sub-signaling, where the first sub-signaling comprises the first priority.

In one embodiment, the second signaling comprises a first sub-signaling and a second sub-signaling, where the first sub-signaling comprises the second priority, while the second sub-signaling carries an Identity of the first node.

In one embodiment, the second signaling comprises a first sub-signaling and a second sub-signaling, where the first sub-signaling is a first-class SCI format, while the second sub-signaling is a second-class SCI format, the first sub-signaling comprising the second priority.

In one embodiment, the multicarrier symbol in the present application is a Single-Carrier Frequency Division Multiple Access (SC-FDMA) symbol.

In one embodiment, the multicarrier symbol in the present application is a Discrete Fourier Transform Spread Orthogonal Frequency Division Multiplexing (DFT-S-OFDM) symbol.

In one embodiment, the multicarrier symbol in the present application is a Frequency Division Multiple Access (FDMA) symbol.

In one embodiment, the multicarrier symbol in the present application is a Filter Bank Multi-Carrier (FBMC) symbol.

In one embodiment, the multicarrier symbol in the present application is an Interleaved Frequency Division Multiple Access (IFDMA) symbol.

Embodiment 2

Figure 2:
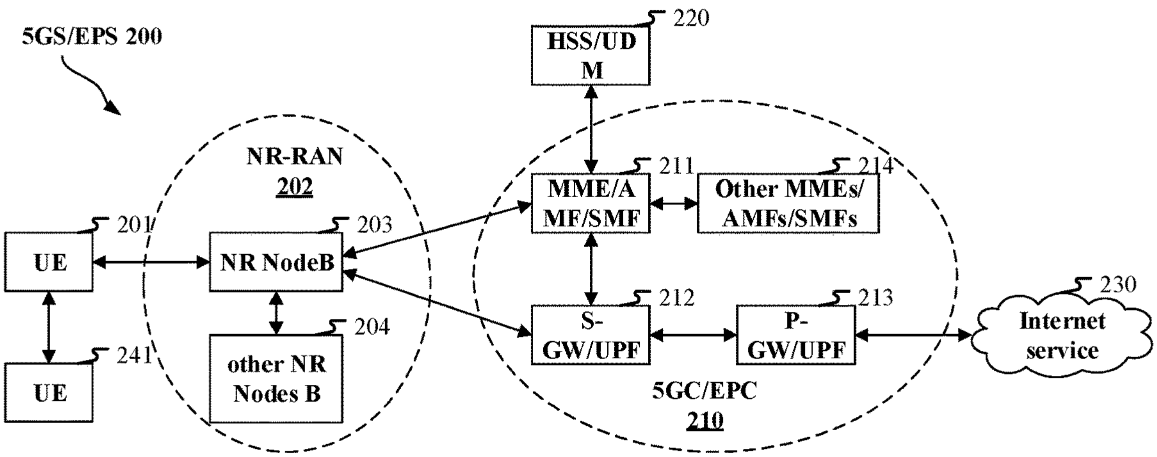
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be the satellite, an aircraft or a terrestrial base station relayed by the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application includes the UE 201.

In one embodiment, the second node in the present application includes the UE 241.

In one embodiment, the third node in the present application includes the gNB 203.

In one embodiment, the UE in the present application includes the UE 201.

In one embodiment, the UE in the present application includes the UE 241.

In one embodiment, the base station in the present application includes the gNB 203.

In one embodiment, a receiver for the first signaling in the present application includes the UE 201.

In one embodiment, a transmitter for the first signaling in the present application includes the UE 241.

In one embodiment, a transmitter for the second signaling in the present application includes the UE 201.

In one embodiment, a receiver for the second signaling in the present application includes the UE 241.

In one embodiment, a receiver for the third signaling in the present application includes the UE 201.

In one embodiment, a transmitter for the third signaling in the present application includes the gNB 203.

Embodiment 3

Figure 3:
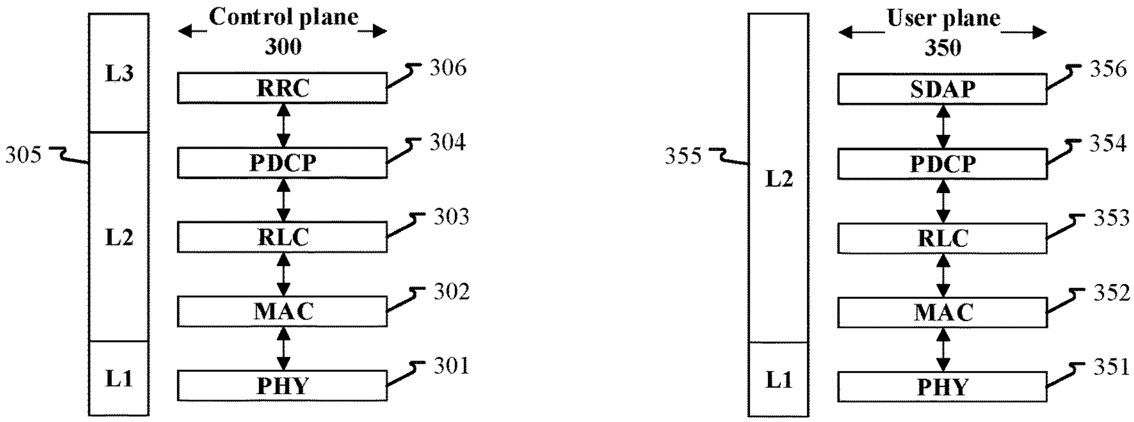
FIG. 3 illustrates a schematic diagram of a radio protocol architecture of a user plane and a control plane according to one embodiment of the present application.

Embodiment 3 illustrates a schematic diagram of an embodiment of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or RSU in V2X, vehicle-mounted equipment or vehicle-mounted communication module) and a second node (gNB, UE, or RSU in V2X, vehicle-mounted equipment or vehicle-mounted communication module), or between two UEs is represented by three layers, which are a layer 1, a layer 2 and a layer 3, respectively. Layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection, and provides support for handover of a first node between second nodes. The RLC sublayer 303 provides segmentation and reassembling of a packet, retransmission of a missing packet via ARQ, as well as support for detections over repeated packets and protocol errors. The MAC sublayer 302 provides mapping between a logical channel and a transport channel and multiplexing of logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several upper layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signaling in the present application is generated by the PHY 301.

In one embodiment, the first signaling in the present application is generated by the RRC sublayer 306.

In one embodiment, the first signaling in the present application is conveyed from the MAC sublayer 302 to the PHY 301.

In one embodiment, the second signaling in the present application is generated by the PHY 301.

In one embodiment, the second signaling in the present application is generated by the RRC sublayer 306.

In one embodiment, the second signaling in the present application is conveyed from the MAC sublayer 302 to the PHY 301.

In one embodiment, the second signaling in the present application is generated by the RRC sublayer 306.

Embodiment 4

Figure 4:
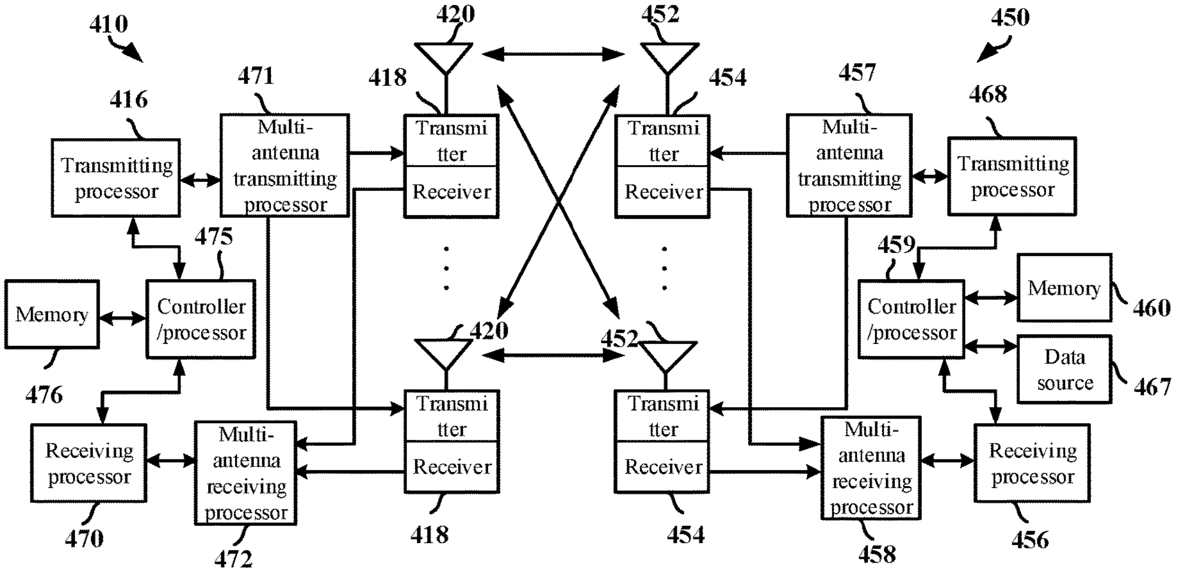
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the second communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present application comprises the second communication device 450, and the second node in the present application comprises the first communication device 410.

In one embodiment, the first node in the present application comprises the second communication device 450, and the third node in the present application comprises the first communication device 410.

In one embodiment, the first node in the present application comprises the second communication device 450, and the second node in the present application comprises the first communication device 410, and the third node in the present application comprises the first communication device 410.

In one subembodiment, the first node is a UE, and the second node is a UE.

In one subembodiment, the first node is a UE, and the second node is a UE, and the third node is a relay node.

In one subembodiment, the first node is a UE, and the second node is a relay node, and the third node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first signaling; performs a first channel sensing in a first resource pool; and determines a target resource pool; and selects a target time-frequency resource block in the target resource pool; and transmits a second signaling on the target time-frequency resource block; the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

In one embodiment, the second communication device 450 comprises a memory that stores a computer readable instruction program, the computer readable instruction program generates actions when executed by at least one processor, which include: receiving a first signaling; performing a first channel sensing in a first resource pool; and determining a target resource pool; and selecting a target time-frequency resource block in the target resource pool; and transmitting a second signaling on the target time-frequency resource block; the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first signaling; and receives a second signaling on a target time-frequency resource block; the first signaling is used to indicate a first reference resource set, the first reference resource set comprising at least one time-frequency resource block; whether the first reference resource set comprises a first candidate time-frequency resource block is used by a receiver receiving the first signaling to determine whether the first candidate time-frequency resource block is chosen as the target time-frequency resource block; the second signaling indicates the target time-frequency resource block.

In one embodiment, the first communication device 410 comprises a memory that stores a computer readable instruction program, the computer readable instruction program generates actions when executed by at least one processor, which include: transmitting a first signaling; and receiving a second signaling on a target time-frequency resource block; the first signaling is used to indicate a first reference resource set, the first reference resource set comprising at least one time-frequency resource block; whether the first reference resource set comprises a first candidate time-frequency resource block is used by a receiver receiving the first signaling to determine whether the first candidate time-frequency resource block is chosen as the target time-frequency resource block; the second signaling indicates the target time-frequency resource block.

In one embodiment, at least one of the antenna 452, the receiver 454, the multi-antenna receiving processor 458, the receiving processor 456, the controller/processor 459, the memory 460, or the data source 467 is used for receiving the third signaling in the present application.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 452, the receiver 454, the multi-antenna receiving processor 458, the receiving processor 456, the controller/processor 459, the memory 460, or the data source 467 is used for performing first channel sensing in a first resource pool in the present application.

In one embodiment, at least one of the antenna 452, the receiver 454, the multi-antenna receiving processor 458, the receiving processor 456, the controller/processor 459, the memory 460, or the data source 467 is used for determining the target resource pool in the present application.

In one embodiment, at least one of the antenna 452, the transmitter 454, the multi-antenna transmitting processor 458, the transmitting processor 468, the controller/processor 459, the memory 460 or the data source 467 is used for selecting the target time-frequency resource block in the target resource pool in the present application.

In one embodiment, at least one of the antenna 452, the transmitter 454, the multi-antenna transmitting processor 458, the transmitting processor 468, the controller/processor 459, the memory 460 or the data source 467 is used for transmitting the second signaling on the target time-frequency resource block in the present application.

In one embodiment, at least one of the antenna 420, the transmitter 418, the multi-antenna transmitting processor 471, the transmitting processor 416, the controller/processor 475 or the memory 476 is used for transmitting the first signaling in the present application.

In one embodiment, at least one of the antenna 420, the receiver 418, the multi-antenna receiving processor 472, the receiving processor 470, the controller/processor 475, or the memory 476 is used for receiving the second signaling on the target time-frequency resource block in the present application.

In one embodiment, at least one of the antenna 420, the transmitter 418, the multi-antenna transmitting processor 471, the transmitting processor 416, the controller/processor 475 or the memory 476 is used for transmitting the third signaling in the present application.

Embodiment 5

Figure 5:
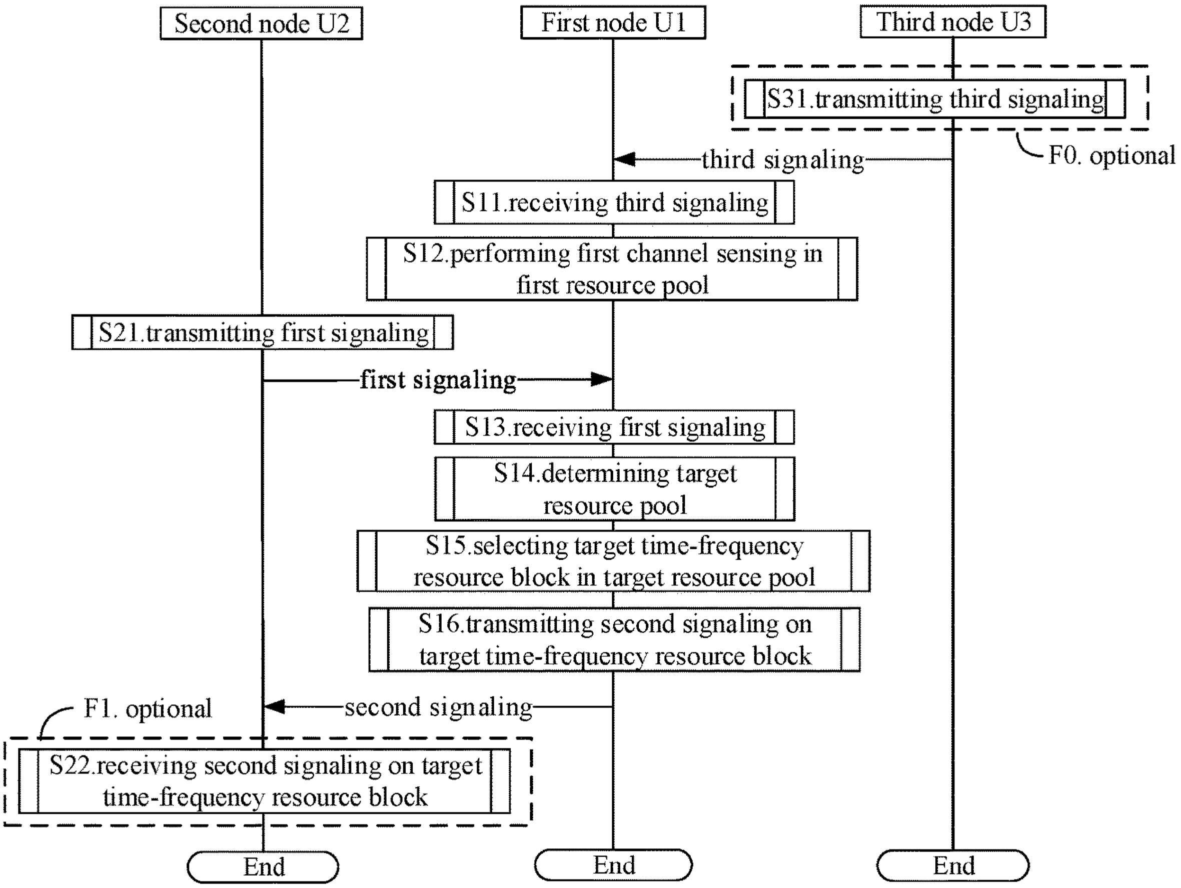
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a first node U1, a second node U2 and a third node U3 are in communications via air interfaces; the step marked by the box F0 and the step marked by the box F1 in FIG. 5 are optional, respectively.

The first node U1 receives a third signaling in step S11; performs a first channel sensing in a first resource pool in step S12; and receives a first signaling in step S13; determines a target resource pool in step S14; selects a target time-frequency resource block in the target resource pool in step S15; and transmits a second signaling on the target time-frequency resource block in step S16.

The second node U2 transmits a first signaling in step S21; and receives a second signaling on a target time-frequency resource block in step S22.

The third node U3 transmits a third signaling in step S31.

In Embodiment 5, the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block; the first candidate time-frequency resource block is associated with a first time-frequency resource block; the first resource pool comprises the first time-frequency resource block; the third signaling indicates a second resource pool, the second resource pool being used to determine the first resource pool.

In one embodiment, a measurement value for the first time-frequency resource block and whether the first candidate time-frequency resource block belongs to the first reference resource set are used together to determine whether the first candidate time-frequency resource block is chosen as the target time-frequency resource block.

In one embodiment, the second resource pool comprises a third time-frequency resource block, a third candidate time-frequency resource block being associated with the third time-frequency resource block; the first resource pool does not comprise the third time-frequency resource block; the first signaling is used to determine whether the third candidate time-frequency resource block belongs to the target resource pool.

In one embodiment, the first resource pool comprises a fourth time-frequency resource block, a fourth candidate time-frequency resource block being associated with the fourth time-frequency resource block; a measurement value for the fourth time-frequency resource block is higher than a first threshold; the first signaling and a first offset value are used together to determine whether the fourth candidate time-frequency resource block belongs to the target resource pool.

In one embodiment, the first node U1 and the second node U2 are in communication via a PC5 interface.

In one embodiment, the first node U1 and the third node U3 are in communication via a Uu interface.

In one embodiment, the step marked by the box F0 in FIG. 5 exists, while the step marked by the box F1 in FIG. 5 does not exist.

In one embodiment, the step marked by the box F0 in FIG. 5 does not exist, while the step marked by the box F1 in FIG. 5 exists.

In one embodiment, the step marked by the box F0 and the step marked by the box F1 in FIG. 5 both exist.

In one embodiment, a transmitter transmitting the third signaling is the third node U3, where the step marked by the box F0 in FIG. 5 exists.

In one embodiment, a transmitter transmitting the third signaling is a higher layer of the first node U1, where the step marked by the box F0 in FIG. 5 does not exist.

In one embodiment, when a transmitter transmitting the third signaling is the third node U3, the step marked by the box F0 in FIG. 5 exists; when a transmitter transmitting the third signaling is a higher layer of the first node U1, the step marked by the box F0 in FIG. 5 does not exist.

In one embodiment, a transmitter transmitting the first signaling and a target receiver receiving the second signaling are co-located, where the step marked by the step F1 in FIG. 5 exists.

In one embodiment, a transmitter transmitting the first signaling and a target receiver receiving the second signaling are non-co-located, where the step marked by the step F1 in FIG. 5 does not exist.

In one embodiment, when a transmitter transmitting the first signaling and a target receiver receiving the second signaling are co-located, the step marked by the step F1 in FIG. 5 exists; when a transmitter transmitting the first signaling and a target receiver receiving the second signaling are non-co-located, the step marked by the step F1 in FIG. 5 does not exist.

In one embodiment, the third signaling comprises all or part of a higher layer signaling.

In one embodiment, the third signaling comprise all or part of an RRC layer signaling.

In one embodiment, the third signaling comprises one or more fields in a Radio Resource Control Information Element (RRC IE).

In one embodiment, the third signaling comprises all or part of a PC5-RRC signaling.

In one embodiment, the third signaling comprises all or part of a MAC layer signaling.

In one embodiment, the third signaling comprises one or more fields in a Multimedia Access Control Control Element (MAC CE).

In one embodiment, a channel occupied by the third signaling includes a PSCCH.

In one embodiment, a channel occupied by the third signaling includes a PSSCH.

In one embodiment, the third signaling indicates the second resource pool.

In one embodiment, the third signaling indicates time-domain resources occupied by the second resource pool.

In one embodiment, the third signaling indicates frequency-domain resources occupied by the second resource pool.

In one embodiment, the third signaling comprises multiple fields, where time-domain resources occupied by the second resource pool and frequency-domain resources occupied by the second resource pool are two fields among the multiple fields comprised in the third signaling.

In one embodiment, the third signaling comprises a Sidelink Information Element (SL IE).

In one embodiment, the third signaling comprises a SL-ResourcePool.

In one embodiment, for the specific definition of the SL-ResourcePool, refer to TS8.331, Section 6.3.5.

In one embodiment, a transmitter transmitting the first signaling and a target receiver receiving the second signaling are co-located.

In one embodiment, a transmitter transmitting the first signaling and a target receiver receiving the second signaling are a same communication node.

In one embodiment, a transmitter transmitting the first signaling and a target receiver receiving the second signaling are the second node U2.

In one embodiment, a transmitter transmitting the first signaling and a target receiver receiving the second signaling are a same UE.

In one embodiment, a Backhaul Link between a transmitter transmitting the first signaling and a target receiver receiving the second signaling is ideal (namely, the delay can be ignored).

In one embodiment, a transmitter transmitting the first signaling and a target receiver receiving the second signaling share a same set of BaseBand equipment.

In one embodiment, a transmitter transmitting the first signaling and a target receiver receiving the second signaling are non-co-located.

In one embodiment, a transmitter transmitting the first signaling and a target receiver receiving the second signaling are respectively two different communication nodes.

In one embodiment, a transmitter transmitting the first signaling is the second node U2, and a target receiver receiving the second signaling is a communication node different from the second node U2.

In one embodiment, a transmitter transmitting the first signaling and a target receiver receiving the second signaling are respectively two different UEs.

In one embodiment, a Backhaul Link between a transmitter transmitting the first signaling and a target receiver receiving the second signaling is non-ideal (namely, the delay cannot be ignored).

In one embodiment, a transmitter transmitting the first signaling and a target receiver receiving the second signaling do not share a same set of BaseBand equipment.

Embodiment 6

Figure 6:
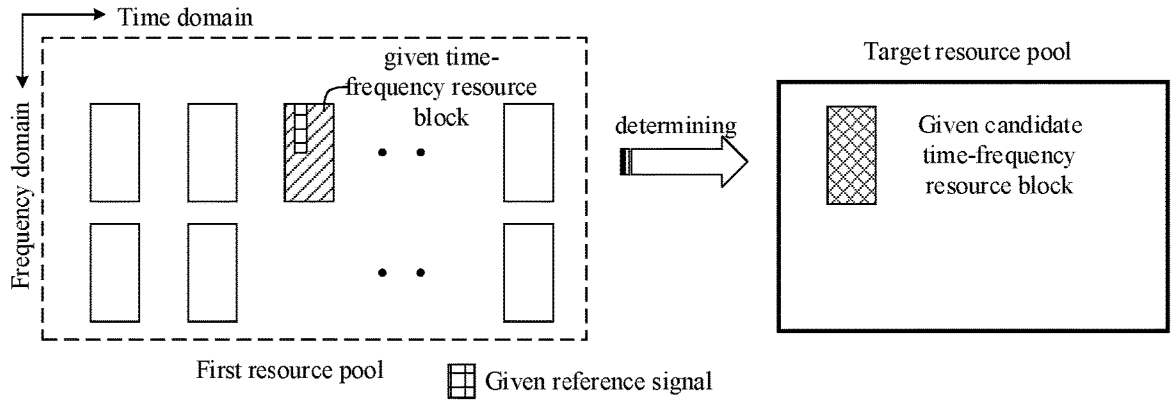
FIG. 6 illustrates a schematic diagram of relations among a first resource pool, a given time-domain resource block, a given reference signal, and a given candidate time-frequency resource block and a target resource pool according to one embodiment of the present application.

Embodiment 6 illustrates a schematic diagram of relations among a first resource pool, a given time-domain resource block, a given reference signal, and a given candidate time-frequency resource block and a target resource pool according to one embodiment of the present application, as shown in FIG. 6. In FIG. 6, the dotted-line box represents a first resource pool in the present application; each rectangle in the dotted-line box represents a time-frequency resource block in the first resource pool; the slash-filled rectangle represents a given time-frequency resource block in the present application; the grid-filled rectangle represents a given reference signal in the present application; the thick-solid-line framed box represents a target resource pool in the present application; the cross-filled rectangle represents a given candidate time-frequency resource block in the present application.

In Embodiment 6, the given time-frequency resource block is a time-frequency resource block in the first resource pool, and the given candidate time-frequency resource block is associated with the given time-frequency resource block, the given reference signal being transmitted on the given time-frequency resource block; a measurement on the given reference signal is used to determine whether the given candidate time-frequency resource block belongs to the target resource pool.

In one embodiment, the first channel sensing is used to determine the target resource pool.

In one embodiment, the first channel sensing comprises receiving a given signaling, measuring a given reference signal on a given time-frequency resource block, and determining whether a given candidate time-frequency resource block belongs to the target resource pool; the given time-frequency resource block belongs to the first resource pool; the given candidate time-frequency resource block is associated with the given time-frequency resource block.

In one embodiment, the first channel sensing comprises determining a first resource pool, receiving a given signaling, and determining a given threshold, measuring a given reference signal on a given time-frequency resource block, and determining whether a given candidate time-frequency resource block belongs to the target resource pool; the given time-frequency resource block belongs to the first resource pool; the given candidate time-frequency resource block is associated with the given time-frequency resource block.

In one embodiment, the given time-frequency resource block is one of the multiple time-frequency resource blocks comprised in the first resource pool.

In one embodiment, the first resource pool comprises the given time-frequency resource block.

In one embodiment, the given reference signal is transmitted on the given time-frequency resource block.

In one embodiment, the given candidate time-frequency resource block comprises a first candidate time-frequency resource block in the present application, while the given time-frequency resource block comprises a first time-frequency resource block in the present application.

In one embodiment, the given candidate time-frequency resource block comprises a second candidate time-frequency resource block in the present application, while the given time-frequency resource block comprises a second time-frequency resource block in the present application.

In one embodiment, the given candidate time-frequency resource block comprises a fourth candidate time-frequency resource block in the present application, while the given time-frequency resource block comprises a fourth time-frequency resource block in the present application.

In one embodiment, the given signaling indicates the given time-frequency resource block.

In one embodiment, the given signaling indicates time-frequency resources occupied by the given time-frequency resource block.

In one embodiment, the given signaling indicates the given reference signal.

In one embodiment, the given reference signal comprises a first reference signal in the present application.

In one embodiment, the given signaling indicates a first priority.

In one embodiment, the second signaling indicates a second priority.

In one embodiment, the first priority and the second priority are used together to determine a given threshold.

In one embodiment, a measurement value for the given reference signal is used to determine whether the given candidate time-frequency resource block belongs to the target resource pool.

In one embodiment, a measurement value for the given reference signal is higher than the given threshold, and the given candidate time-frequency resource block does not belong to the target resource pool.

In one embodiment, a measurement value for the given reference signal is lower than the given threshold, and the given candidate time-frequency resource block belongs to the target resource pool.

In one embodiment, a measurement value for the given reference signal is equal to the given threshold, and the given candidate time-frequency resource block belongs to the target resource pool.

In one embodiment, when a measurement value for the given reference signal is higher than the given threshold, the given candidate time-frequency resource block does not belong to the target resource pool; when a measurement value for the given reference signal is no higher than the given threshold, the given candidate time-frequency resource block belongs to the target resource pool.

In one embodiment, the given signaling comprises an SCI.

In one embodiment, the given threshold is a positive integer.

In one embodiment, the given threshold is a non-positive integer.

In one embodiment, the given threshold is measured in dBm.

In one embodiment, the given threshold is measured in dB.

In one embodiment, the given threshold is measured in mW.

In one embodiment, the given threshold is measured in W.

In one embodiment, the given threshold is a first-type threshold among multiple first-type thresholds.

In one embodiment, any first-type threshold among the multiple first-type thresholds is equal to $(-128+(n-1)\times 2)$ dBm, where n is a positive integer no greater than 65.

In one embodiment, the multiple first-type thresholds are respectively [−infinity dBm, −128 dBm, −126 dBm . . . , 0 dBm, infinity dBm].

In one embodiment, the given threshold is equal to $(-128+(n-1)\times 2)$ dBm, where n is a positive integer no greater than 65.

In one embodiment, the given threshold is one of [−infinity dBm, −128 dBm, −126 dBm, . . . , 0 dBm, infinity dBm].

In one embodiment, the first priority and the second priority are used together to determine an index of the given threshold among the multiple first-type thresholds.

In one embodiment, the multiple first-type thresholds comprise multiple threshold lists, where any one of the multiple threshold lists comprises a positive integer number of first-type threshold(s).

In one embodiment, the positive integer number of first-type threshold(s) comprised in any threshold list of the multiple threshold lists is(are) one of the multiple first-type thresholds.

In one embodiment, a first threshold list is a first threshold list among the multiple threshold lists, the first threshold list comprising a positive integer number of first-type threshold(s), where the given threshold is one of the positive integer number of first-type threshold(s) comprised in the first threshold list.

In one embodiment, the second priority is used to indicate an index of the first threshold list among the multiple threshold lists, while the first priority is used to indicate an index of the given threshold among the positive integer number of first-type threshold(s) comprised in the first threshold list.

In one embodiment, an index of the given threshold among the multiple first-type thresholds is equal to a sum of C1 times the first priority and B1 further plus 1, where B1 is a positive integer no greater than 12, and C1 is a positive integer.

In one embodiment, an index of the given threshold among the multiple first-type thresholds is equal to a sum of C2 times the second priority and B2 further plus 1, where B2 is a positive integer no greater than 12, and C2 is a positive integer.

In one embodiment, an index of the given threshold among the multiple first-type thresholds is equal to a sum of C1 times B1 and the first priority further plus 1, where C1 is a positive integer.

In one embodiment, an index of the given threshold among the multiple first-type thresholds is equal to a sum of C2 times B2 and the second priority further plus 1, where C2 is a positive integer.

In one embodiment, C1 is equal to 8.

In one embodiment, C1 is equal to 10.

In one embodiment, C2 is equal to 8.

In one embodiment, C2 is equal to 10.

In one embodiment, the phrase of "performing a first channel sensing in a first resource pool" comprises: receiving a positive integer number of first-type signaling(s) respectively on the multiple time-frequency resource blocks comprised in the first resource pool; and measuring a positive integer number of first-type reference signal(s) (respectively) on a positive integer number of first-type time-frequency resource block(s); and respectively determining whether each of a positive integer number of first-type candidate time-frequency resource block(s) belongs to the target resource pool.

In one embodiment, the positive integer number of first-type signaling(s) indicates/respectively indicate the positive integer number of first-type time-frequency resource block(s) and the positive integer number of first-type reference signal(s).

In one embodiment, the positive integer number of first-type reference signal(s) is/are respectively transmitted on the positive integer number of first-type time-frequency resource block(s).

In one embodiment, any first-type time-frequency resource block of the positive integer number of first-type time-frequency resource block(s) is one of multiple time-frequency resource blocks comprised in the first resource pool.

In one embodiment, the positive integer number of first-type candidate time-frequency resource block(s) is/are respectively associated with the positive integer number of first-type time-frequency resource block(s).

In one embodiment, the phrase of "performing a first channel sensing in a first resource pool" comprises: determining a first resource pool, and respectively receiving a positive integer number of first-type signaling(s); respectively determining a positive integer number of first-type threshold(s); and measuring a positive integer number of first-type reference signal(s) (respectively) on a positive integer number of first-type time-frequency resource block(s); and respectively determining whether each of a positive integer number of first-type candidate time-frequency resource block(s) belongs to the target resource pool.

In one embodiment, the given signaling is any one of the positive integer number of first-type signaling(s).

In one embodiment, the given time-frequency resource block is a first-type time-frequency resource block indicated by the given signaling among the positive integer number of first-type time-frequency resource block(s).

In one embodiment, the given reference signal is a first-type reference signal transmitted on the given time-frequency resource block among the positive integer number of first-type reference signal(s).

In one embodiment, the given candidate time-frequency resource block is a first-type candidate time-frequency resource block associated with the given time-frequency resource block among the positive integer number of first-type candidate time-frequency resource block(s).

In one embodiment, a measurement value for any first-type reference signal of the positive integer number of first-type reference signal(s) is used to determine whether a first-type candidate time-frequency resource block of the positive integer number of first-type candidate time-frequency resource block(s) belongs to the target resource pool.

In one embodiment, a positive integer number of measurement value(s) for the positive integer number of first-type reference signal(s) is(are respectively) used to determine whether each of the positive integer number of first-type candidate time-frequency resource block(s) belongs to the target resource block.

In one embodiment, the positive integer number of first-type time-frequency resource block(s) corresponds/respectively correspond to the positive integer number of first-type candidate time-frequency resource block(s).

In one embodiment, the first resource pool comprises the positive integer number of first-type time-frequency resource block(s).

In one embodiment, the positive integer number of first-type reference signal(s) is/are respectively transmitted on the positive integer number of first-type time-frequency resource block(s).

In one embodiment, the first signaling and the first channel sensing are used together to determine the target resource pool.

In one embodiment, the first reference resource set indicated by the first signaling and the first channel sensing are used together to determine the target resource pool.

In one embodiment, performing the first channel sensing in the first resource pool is used to determine that each of Q first-type candidate time-frequency resource block(s) among the positive integer number of first-type candidate time-frequency resource block(s) belongs to the target resource pool, where the positive integer number of first-type candidate time-frequency resource block(s) is(are) associated with the positive integer number of first-type time-frequency resource block(s) in the first resource pool; the first signaling indicates that each of the positive integer number of time-frequency resource block(s) comprised in the first reference resource set belongs to the target resource pool; the Q first-type candidate time-frequency resource block(s) and the positive integer number of time-frequency resource block(s) comprised in the first reference resource set are overlapping, Q being a positive integer.

In one embodiment, at least one time-frequency resource block of the positive integer number of time-frequency resource block(s) comprised in the first reference resource set is identical to a first-type candidate time-frequency resource block of the Q first-type candidate time-frequency resource block(s).

In one embodiment, at least one time-frequency resource block of the positive integer number of time-frequency resource block(s) comprised in the first reference resource set is different from a first-type candidate time-frequency resource block of the Q first-type candidate time-frequency resource block(s).

In one embodiment, performing the first channel sensing in the first resource pool is used to determine that each of Q first-type candidate time-frequency resource block(s) among the positive integer number of first-type candidate time-frequency resource block(s) belongs to the target resource pool, where the positive integer number of first-type candidate time-frequency resource block(s) is(are) associated with the positive integer number of first-type time-frequency resource block(s) in the first resource pool; the first signaling indicates that each of the positive integer number of time-frequency resource block(s) comprised in the first reference resource set belongs to the target resource pool; the Q first-type candidate time-frequency resource block(s) and the positive integer number of time-frequency resource block(s) comprised in the first reference resource set are non-overlapping.

In one embodiment, any time-frequency resource block of the positive integer number of time-frequency resource block(s) comprised in the first reference resource set is different from any first-type candidate time-frequency resource block of the Q first-type candidate time-frequency resource block(s).

In one embodiment, performing the first channel sensing in the first resource pool is used to determine that each of Q first-type candidate time-frequency resource block(s) among the positive integer number of first-type candidate time-frequency resource block(s) belongs to the target resource pool, where the positive integer number of first-type candidate time-frequency resource block(s) is(are) associated with the positive integer number of first-type time-frequency resource block(s) in the first resource pool; the first signaling indicates that each of the positive integer number of time-frequency resource block(s) comprised in the first reference resource set does not belong to the target resource pool; the Q first-type candidate time-frequency resource block(s) and the positive integer number of time-frequency resource block(s) comprised in the first reference resource set are overlapping.

In one embodiment, the first priority and the second priority are two positive integers, respectively.

In one embodiment, the first priority is a non-negative integer no greater than 12.

In one embodiment, the second priority is a non-negative integer no greater than 12.

In one embodiment, the first priority is one of P positive integers, P being a positive integer.

In one embodiment, the second priority is one of P positive integers, P being a positive integer.

In one embodiment, the first priority is a positive integer of 1 through P.

In one embodiment, the second priority is a positive integer of 1 through P.

In one embodiment, a first-type signaling of the positive integer number of first-type signaling(s) indicates the first priority; the second signaling carries the second priority.

In one embodiment, the given signaling indicates the first priority, while the second signaling carries the second priority.

In one embodiment, the given reference signal comprises a first sequence.

In one embodiment, a first sequence is used for generating the given reference signal.

In one embodiment, the first sequence is a Pseudo-Random Sequence.

In one embodiment, the first sequence is a Low-Peak to Average Power Ratio (Low-PAPR Sequence).

In one embodiment, the first sequence is a Gold sequence.

In one embodiment, the first sequence is an M sequence.

In one embodiment, the first sequence is a Zadeoff-Chu sequence.

In one embodiment, the given reference signal is obtained by the first sequence sequentially through Sequence Generation, Discrete Fourier Transform (DFT), Modulation, Resource Element Mapping, and Wideband Symbol Generation.

In one embodiment, the first signal is obtained by the first sequence sequentially through Sequence Generation, Resource Element Mapping and Wideband Symbol Generation.

In one embodiment, the first sequence is mapped to a positive integer number of RE(s).

In one embodiment, the given reference signal is used for data demodulation.

In one embodiment, the given reference signal is used for sounding Channel State Information (CSI).

In one embodiment, the given reference signal comprises an SL DeModulation Reference Signal (DMRS).

In one embodiment, the given reference signal comprises a PSCCH DMRS.

In one embodiment, the given reference signal comprises a PSSCH DMRS.

In one embodiment, the given reference signal comprises an Uplink (UL) DMRS.

In one embodiment, the given reference signal comprises a SL Channel State Information Reference Signal (CSI-RS).

In one embodiment, the given reference signal comprises a UL Sounding Reference Signal (SRS).

In one embodiment, the given reference signal comprises a Sidelink Synchronization Signal/Physical Sidelink Broadcast Channel Block (S-SS/PSBCH Block).

In one embodiment, the given reference signal is measured on the given time-domain resource block.

In one embodiment, a measurement on a given time-frequency resource block comprises measuring a given reference signal on a given time-frequency resource block.

In one embodiment, the given time-domain resource block comprises time-frequency resources occupied by the given reference signal.

In one embodiment, the positive integer number of first-type time-frequency resource block(s) comprises/respectively comprise time-frequency resources occupied by the positive integer number of first-type reference signal(s).

In one embodiment, the phrase of "measuring a given reference signal on a given time-frequency resource block" comprises performing coherent-detection-based reception of time-frequency resources occupied by the given reference signal on the given time-frequency resource block, namely, the first node uses the first sequence comprised in the given reference signal for performing coherent reception on a signal on time-frequency resources occupied by the given reference signal, and measuring signal energy obtained by the coherent reception.

In one embodiment, the phrase of "measuring a given reference signal on a given time-frequency resource block" comprises performing coherent-detection-based reception of time-frequency resources occupied by the given reference signal on the given time-frequency resource block, namely, the first node uses the first sequence comprised in the given reference signal for performing coherent reception on a signal on time-frequency resources occupied by the given reference signal, and making a linear average of signal powers received on the multiple REs comprised in time-frequency resources occupied by the given reference signal to obtain a received power.

In one embodiment, the phrase of "measuring a given reference signal on a given time-frequency resource block" comprises performing coherent-detection-based reception of time-frequency resources occupied by the given reference signal on the given time-frequency resource block, namely, the first node uses the first sequence comprised in the given reference signal for performing coherent reception on a signal on time-frequency resources occupied by the given reference signal, and averaging signal energy received in time domain and frequency domain to obtain a received power.

In one embodiment, the phrase of "measuring a given reference signal on a given time-frequency resource block" comprises performing energy-detection-based reception of time-frequency resources occupied by the given reference signal on the given time-frequency resource block, namely, the first node senses energies of radio signals respectively on the multiple REs comprised in time-frequency resources occupied by the given reference signal, and averaging in the multiple REs comprised in the time-frequency resources occupied by the given reference signal to obtain a received power.

In one embodiment, the phrase of "measuring a given reference signal on a given time-frequency resource block" comprises performing energy-detection-based reception on the given time-frequency resource block, namely, the first node receives a power of the given reference signal on the given time-frequency resource block, and makes a linear average of the power of the given reference signal received to obtain a Signal Strength Indicator (SSI).

In one embodiment, the phrase of "measuring a given reference signal on a given time-frequency resource block" comprises performing energy-detection-based reception on the given time-frequency resource block, namely, the first node senses energy of a radio signal on the given time-frequency resource block, and averages in time to obtain a Signal Strength Indicator (SSI).

In one embodiment, the phrase of "measuring a given reference signal on a given time-frequency resource block" comprises receiving based on blind detection on the given time-frequency resource block, namely, the first node receives a signal on the given time-frequency resource block and performs decoding operation, determines according to a CRC bit whether decoding is correct, so as to obtain a channel quality of the given reference signal on time-frequency resources occupied by the given reference signal.

In one embodiment, the given candidate time-frequency resource block is associated with the given time-frequency resource block.

In one embodiment, the given time-frequency resource block and the given candidate time-frequency resource blocks are associated.

In one embodiment, the given time-frequency resource block and the given candidate time-frequency resource blocks are orthogonal.

In one embodiment, the given time-frequency resource block and the given candidate time-frequency resource block are orthogonal in time domain, where the given time-frequency resource block and the given candidate time-frequency resource block occupy same frequency-domain resources.

In one embodiment, the given time-frequency resource block comprises L consecutive frequency-domain resource blocks, and the given candidate time-frequency resource block comprises L consecutive frequency-domain resource blocks, where the L consecutive frequency-domain resource blocks in the given time-frequency resource blocks and the L consecutive frequency-domain resource blocks in the given candidate time-frequency resource blocks are identical.

In one embodiment, L is a positive integer.

In one embodiment, the given time-frequency resource block and the given candidate time-frequency resource block are orthogonal in time domain, where the positive integer number of subcarrier(s) occupied by the given time-frequency resource block in frequency domain and the positive integer number of subcarrier(s) occupied by the given candidate time-frequency resource block in frequency domain are identical.

In one embodiment, the given time-frequency resource block and the given candidate time-frequency resource block are orthogonal in time domain, and the given time-frequency resource block and the given candidate time-frequency resource block are also orthogonal in frequency domain.

In one embodiment, the given time-frequency resource block and the given candidate time-frequency resource block are two time-frequency resource blocks that are Time Division Multiplexing (TDM) in a sidelink resource pool.

In one embodiment, the given time-frequency resource block and the given candidate time-frequency resource block are two time-frequency resource blocks that are TDM in a sidelink reception resource pool.

In one embodiment, the given time-frequency resource block is earlier than the given candidate time-frequency resource block in time domain.

In one embodiment, the given time-frequency resource block and the given candidate time-frequency resource block are two time-frequency resource blocks that are TDM in a sidelink resource pool, where the given time-frequency resource block is earlier than the given candidate time-frequency resource block in time domain.

In one embodiment, the given candidate time-frequency resource block and the given time-frequency resource block are spaced by a first time difference in time domain, where the given candidate time-frequency resource block and the given time-frequency resource block occupy same frequency-domain resources.

In one embodiment, the given candidate time-frequency resource block and the given time-frequency resource block are spaced by a first time difference in time domain, where the L consecutive frequency-domain resource blocks comprised by the given candidate time-frequency resource block and the L consecutive frequency-domain resource blocks comprised by the given time-frequency resource block are identical.

In one embodiment, the first time difference comprises a positive integer number of time-domain resource unit(s).

In one embodiment, the first time difference comprises a positive integer number of slot(s).

In one embodiment, the first time difference comprises a positive integer number of multicarrier symbol(s).

In one embodiment, the first resource pool comprises a given time-frequency resource group, the given time-frequency resource group comprising multiple time-frequency resource blocks, where any two adjacent time-frequency resource blocks among the multiple time-frequency resource blocks comprised in the given time-frequency resource group are spaced at equal intervals in time domain, the given time-frequency resource block being a time-frequency resource block in the given time-frequency resource group.

In one embodiment, frequency-domain resources occupied by the multiple time-frequency resource blocks comprised in the given time-frequency resource group are identical.

In one embodiment, L consecutive frequency-domain resource blocks comprised by any time-frequency resource block in the given time-frequency resource group in frequency domain and L consecutive frequency-domain resource blocks comprised by the given time-frequency resource block in frequency domain are identical.

In one embodiment, the given time-frequency resource block is one of the multiple time-frequency resource blocks comprised in the given time-frequency resource group, and the given candidate time-frequency resource block is a time-frequency resource block other than the multiple time-frequency resource blocks comprised in the given time-frequency resource group, an interval in time domain between the given candidate time-frequency resource block and a latest time-frequency resource block in the given time-frequency resource group is equal to an interval in time domain between any two adjacent time-frequency resource blocks among the multiple time-frequency resource blocks comprised in the given time-frequency resource group.

In one embodiment, the given candidate time-frequency resource block is later than any time-frequency resource block in the given time-frequency resource group in time domain.

In one embodiment, the L consecutive frequency-domain resource blocks comprised by the given candidate time-frequency resource block in frequency domain and the L consecutive frequency-domain resource blocks comprised by any time-frequency resource block in the given time-frequency resource group are identical.

Embodiment 7

Figure 7:
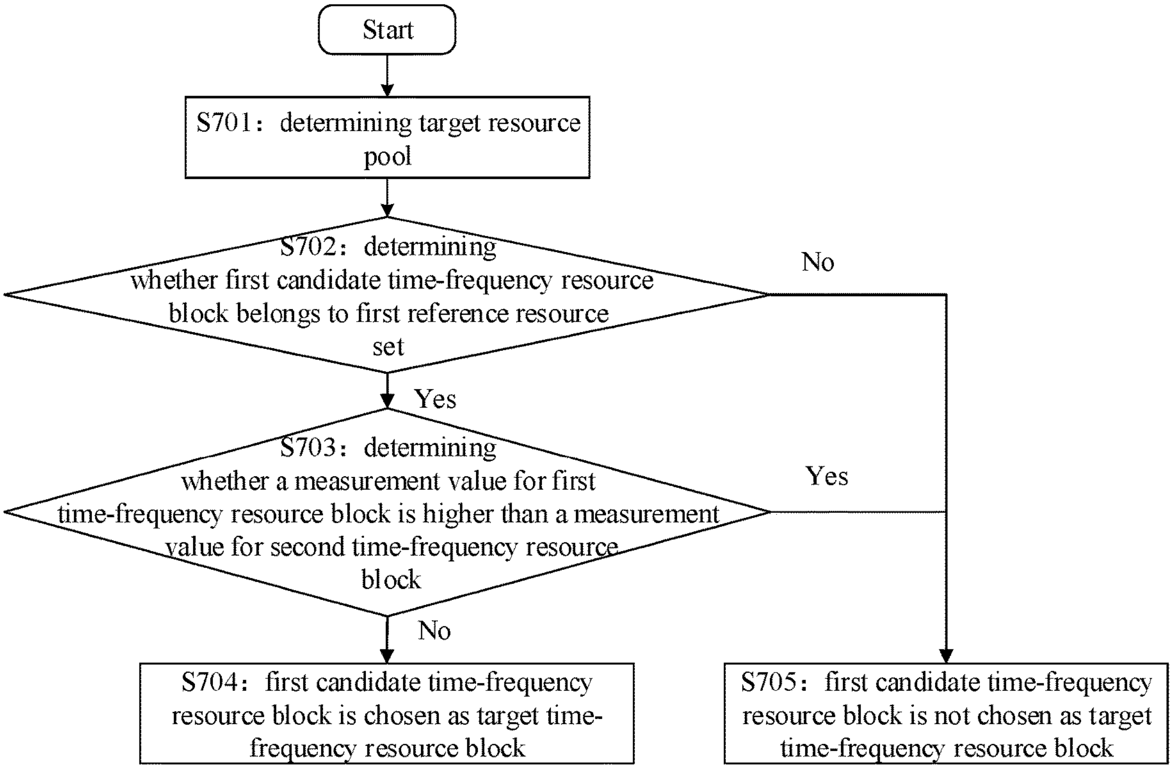
FIG. 7 illustrates a flowchart of determining whether a first candidate time-frequency resource block is chosen as a target time-frequency resource block according to one embodiment of the present application.

Embodiment 7 illustrates a flowchart of determining whether a first candidate time-frequency resource block is chosen as a target time-frequency resource block according to one embodiment of the present application, as shown in FIG. 7. In FIG. 7, determining a target resource pool in step S701; and determining whether a first candidate time-frequency resource block belongs to a first reference resource set in step S702; determining in step S703 whether a measurement value for a first time-frequency resource block is higher than a measurement value for a second time-frequency resource block; when the first candidate time-frequency resource block belongs to a first reference resource set, performing step S703; when the first candidate time-frequency resource block does not belong to a first reference resource set, performing step S705, where the first candidate time-frequency resource block is not chosen as a target time-frequency resource block; when a measurement value for a first time-frequency resource block is lower than or equal to a measurement value for a second time-frequency resource block, performing step S704, where the first candidate time-frequency resource block is chosen as a target time-frequency resource block; when a measurement value for a first time-frequency resource block is higher than a measurement value for a second time-frequency resource block, performing step S705, where the first candidate time-frequency resource block is not chosen as a target time-frequency resource block.

In Embodiment 7, the first candidate time-frequency resource block is associated with a first time-frequency resource block; the first time-frequency resource block is one of the multiple time-frequency resource blocks comprised in the first resource pool; a measurement value for the first time-frequency resource block and whether the first candidate time-frequency resource block belongs to the first reference resource set are used together to determine whether the first candidate time-frequency resource block is chosen as the target time-frequency resource block.

In one embodiment, the first time-frequency resource block is a time-frequency resource block among the multiple time-frequency resource blocks comprised in the first resource pool, the first candidate time-frequency resource block being associated with the first time-frequency resource block.

In one embodiment, a first reference signal is transmitted on the first time-frequency resource block.

In one embodiment, the first time-frequency resource block comprises time-frequency resources occupied by the first reference signal.

In one embodiment, a given time-frequency resource block in the present application comprises the first time-frequency resource block.

In one embodiment, a given candidate time-frequency resource block in the present application comprises the first candidate time-frequency resource block.

In one embodiment, a given reference signal in the present application comprises the first reference signal in the present application.

In one embodiment, the phrase of "measuring a given reference signal on a given time-frequency resource block" comprises measuring the first reference signal on the first time-frequency resource block.

In one embodiment, the measurement for a given time-frequency resource block includes a measurement for a first time-frequency resource block in the present application.

In one embodiment, a measurement for a first time-frequency resource block comprises measuring the first reference signal on the first time-frequency resource block.

In one embodiment, a given candidate time-frequency resource block in the present application is associated with a given time-frequency resource block in the present application; the given time-frequency resource block comprises the first time-frequency resource block, and the given candidate time-frequency resource block comprises the first candidate time-frequency resource block.

In one embodiment, the second time-frequency resource block is a time-frequency resource block among the multiple time-frequency resource blocks comprised in the first resource pool, the second candidate time-frequency resource block being associated with the second time-frequency resource block.

In one embodiment, a second reference signal is transmitted on the second time-frequency resource block.

In one embodiment, the second time-frequency resource block comprises time-frequency resources occupied by the second reference signal.

In one embodiment, a given time-frequency resource block in the present application comprises the second time-frequency resource block.

In one embodiment, a given candidate time-frequency resource block in the present application comprises the second candidate time-frequency resource block.

In one embodiment, a given reference signal in the present application comprises the second reference signal.

In one embodiment, the phrase of "measuring a given reference signal on a given time-frequency resource block" comprises measuring the second reference signal on the second time-frequency resource block.

In one embodiment, the measurement for a given time-frequency resource block includes a measurement for a second time-frequency resource block in the present application.

In one embodiment, a measurement for a second time-frequency resource block comprises measuring the second reference signal on the second time-frequency resource block.

In one embodiment, a given candidate time-frequency resource block in the present application is associated with a given time-frequency resource block in the present application; the given time-frequency resource block comprises the second time-frequency resource block, and the given candidate time-frequency resource block comprises the second candidate time-frequency resource block.

In one embodiment, a first candidate time-frequency resource block and a second candidate time-frequency resource block are any two time-frequency resource blocks among the multiple time-frequency resource blocks comprised in the target resource pool; a first time-frequency resource block and a second time-frequency resource block are two time-frequency resource blocks among multiple time-frequency resource blocks comprised in the first resource pool; the first candidate time-frequency resource block is associated with the first time-frequency resource block; the second candidate time-frequency resource block is associated with the second time-frequency resource block.

In one embodiment, a first candidate time-frequency resource block is any one of the multiple time-frequency resource blocks comprised in the target resource pool; a first time-frequency resource block is one of multiple time-frequency resource blocks comprised in the first resource pool; the first candidate time-frequency resource block is associated with the first time-frequency resource block.

In one embodiment, a second candidate time-frequency resource block is a time-frequency resource block different from the first candidate time-frequency resource block among the multiple time-frequency resource blocks comprised in the target resource pool; a second time-frequency resource block is one of multiple time-frequency resource blocks comprised in the first resource pool; the second candidate time-frequency resource block is associated with the second time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; when a measurement value for the first time-frequency resource block is lower than a measurement value for the second time-frequency resource block, the first candidate time-frequency resource block is chosen as the target time-frequency resource block; when a measurement value for the first time-frequency resource block is higher than a measurement value for the second time-frequency resource block, the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; when a measurement value for the first time-frequency resource block is lower than a measurement value for the second time-frequency resource block, the first candidate time-frequency resource block is chosen as the target time-frequency resource block; when a measurement value for the first time-frequency resource block is equal to a measurement value for the second time-frequency resource block, the first candidate time-frequency resource block is chosen as the target time-frequency resource block; when a measurement value for the first time-frequency resource block is higher than a measurement value for the second time-frequency resource block, the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; when a measurement value for the first time-frequency resource block is lower than a measurement value for the second time-frequency resource block, the first candidate time-frequency resource block is chosen as the target time-frequency resource block; when a measurement value for the first time-frequency resource block is higher than a measurement value for the second time-frequency resource block, the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; when a measurement value for the first time-frequency resource block is lower than a measurement value for the second time-frequency resource block, the first candidate time-frequency resource block is chosen as the target time-frequency resource block; when a measurement value for the first time-frequency resource block is equal to a measurement value for the second time-frequency resource block, the first candidate time-frequency resource block is chosen as the target time-frequency resource block; when a measurement value for the first time-frequency resource block is higher than a measurement value for the second time-frequency resource block, the second candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is lower than a measurement value for the second time-frequency resource block; when the first candidate time-frequency resource block and the second candidate time-frequency resource block both belong to the first reference resource set, the first candidate time-frequency resource block is chosen as the target time-frequency resource block; when the first candidate time-frequency resource block belongs to the first reference resource set, while the second candidate time-frequency resource block does not belong to the first reference resource set, the first candidate time-frequency resource block is chosen as the target time-frequency resource block; when the first candidate time-frequency resource block does not belong to the first reference resource set, while the second candidate time-frequency resource block belongs to the first reference resource set, the first candidate time-frequency resource block is not chosen as the target time-frequency resource block; when neither the first candidate time-frequency resource block nor the second candidate time-frequency resource block belongs to the first reference resource set, the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is higher than a measurement value for the second time-frequency resource block; when the first candidate time-frequency resource block and the second candidate time-frequency resource block both belong to the first reference resource set, the first candidate time-frequency resource block is not chosen as the target time-frequency resource block; when the first candidate time-frequency resource block belongs to the first reference resource set, while the second candidate time-frequency resource block does not belong to the first reference resource set, the first candidate time-frequency resource block is chosen as the target time-frequency resource block; when the first candidate time-frequency resource block does not belong to the first reference resource set, while the second candidate time-frequency resource block belongs to the first reference resource set, the first candidate time-frequency resource block is not chosen as the target time-frequency resource block; when neither the first candidate time-frequency resource block nor the second candidate time-frequency resource block belongs to the first reference resource set, the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first candidate time-frequency resource block belongs to the first reference resource set, while the second candidate time-frequency resource block does not belong to the first reference resource set; a measurement value for the first time-frequency resource block is higher than a measurement value for the second time-frequency resource block; when a difference between a measurement value for the first time-frequency resource block and a measurement value for the second time-frequency resource block is lower than a first target threshold, the first candidate time-frequency resource block is chosen as the target time-frequency resource block; when a difference between a measurement value for the first time-frequency resource block and a measurement value for the second time-frequency resource block is higher than a first target threshold, the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; a measurement value for the first time-frequency resource block is lower than a measurement value for the second time-frequency resource block, where the first candidate time-frequency resource block of the first candidate time-frequency resource block and the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; a measurement value for the first time-frequency resource block is higher than a measurement value for the second time-frequency resource block, where the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; the first reference resource set comprises the first candidate time-frequency resource block and the second candidate time-frequency resource block; a measurement value for the first time-frequency resource block is equal to a measurement value for the second time-frequency resource block, where the first candidate time-frequency resource block of the first candidate time-frequency resource block and the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is lower than a measurement value for the second time-frequency resource block; the first candidate time-frequency resource block and the second candidate time-frequency resource block both belong to the first reference resource set; the first candidate time-frequency resource block of the first candidate time-frequency resource block and the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is lower than a measurement value for the second time-frequency resource block; the first candidate time-frequency resource block does not belong to the first reference resource set, while the second candidate time-frequency resource block belongs to the first reference resource set, the first candidate time-frequency resource block being not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is lower than a measurement value for the second time-frequency resource block; the first candidate time-frequency resource block belongs to the first reference resource set, while the second candidate time-frequency resource block does not belong to the first reference resource set; the first candidate time-frequency resource block of the first candidate time-frequency resource block and the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is lower than a measurement value for the second time-frequency resource block; neither the first candidate time-frequency resource block nor the second candidate time-frequency resource block belongs to the first reference resource set; the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is higher than a measurement value for the second time-frequency resource block; the first candidate time-frequency resource block and the second candidate time-frequency resource block both belong to the first reference resource set; the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is higher than a measurement value for the second time-frequency resource block; the first candidate time-frequency resource block belongs to the first reference resource set, while the second candidate time-frequency resource block does not belong to the first reference resource set; the first candidate time-frequency resource block of the first candidate time-frequency resource block and the second candidate time-frequency resource block is chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is higher than a measurement value for the second time-frequency resource block; the first candidate time-frequency resource block does not belong to the first reference resource set, while the second candidate time-frequency resource block belongs to the first reference resource set; the first candidate time-frequency resource block is not chosen as the target time-frequency resource block.

In one embodiment, the first candidate time-frequency resource block and the second candidate time-frequency resource block are respectively any two time-frequency resource blocks among the multiple time-frequency resource blocks comprised in the target resource pool; a measurement value for the first time-frequency resource block is higher than a measurement value for the second time-frequency resource block; neither the first candidate time-frequency resource block nor the second candidate time-frequency resource block belongs to the first reference resource set, the first candidate time-frequency resource block being not chosen as the target time-frequency resource block.

In one embodiment, a measurement value for the first time-frequency resource block comprises a Reference Signal Received Power (RSRP) of the first reference signal measured on the first time-frequency resource block.

In one embodiment, a measurement value for the first time-frequency resource block comprises a Received Signal Strength Indication (RSSI) of the first reference signal measured on the first time-frequency resource block.

In one embodiment, a measurement value for the first time-frequency resource block comprises a Reference Signal Receiving Quality (RSRQ) of the first reference signal measured on the first time-frequency resource block.

In one embodiment, a measurement value for the first time-frequency resource block comprises a Signal to Noise Ratio (SNR).

In one embodiment, a measurement value for the first time-frequency resource block comprises a Signal to Interference plus Noise Ratio (SINR).

In one embodiment, a measurement value for the first time-frequency resource block comprises an SL SINR.

In one embodiment, a measurement value for the first time-frequency resource block comprises an SL RSRP.

In one embodiment, a measurement value for the first time-frequency resource block comprises a Layer 1-RSRP (L1-RSRP).

In one embodiment, a measurement value for the first time-frequency resource block comprises a Layer 3-RSRP (L3-RSRP).

In one embodiment, a measurement value for the first time-frequency resource block comprises an SL RSSI.

In one embodiment, a measurement value for the first time-frequency resource block comprises an SL RSRQ.

In one embodiment, a measurement value for the first time-frequency resource block comprises a Channel Quality Indicator (CQI).

In one embodiment, a measurement value for the first time-frequency resource block comprises an SL CQI.

In one embodiment, a measurement value for the second time-frequency resource block comprises an RSRP of the second reference signal measured on the second time-frequency resource block.

In one embodiment, a measurement value for the second time-frequency resource block comprises an RSSI of the second reference signal measured on the second time-frequency resource block.

In one embodiment, a measurement value for the second time-frequency resource block comprises an RSRQ of the second reference signal measured on the second time-frequency resource block.

In one embodiment, a measurement value for the first time-frequency resource block is measured in dBm.

In one embodiment, a measurement value for the first time-frequency resource block is measured in dB.

In one embodiment, a measurement value for the first time-frequency resource block is measured in mW.

In one embodiment, a measurement value for the first time-frequency resource block is measured in W.

In one embodiment, a measurement value for the first time-frequency resource block is measured in dBm.

In one embodiment, a measurement value for the second time-frequency resource block is measured in dB.

In one embodiment, a measurement value for the second time-frequency resource block is measured in mW.

In one embodiment, a measurement value for the second time-frequency resource block is measured in W.

Embodiment 8

Figure 8:
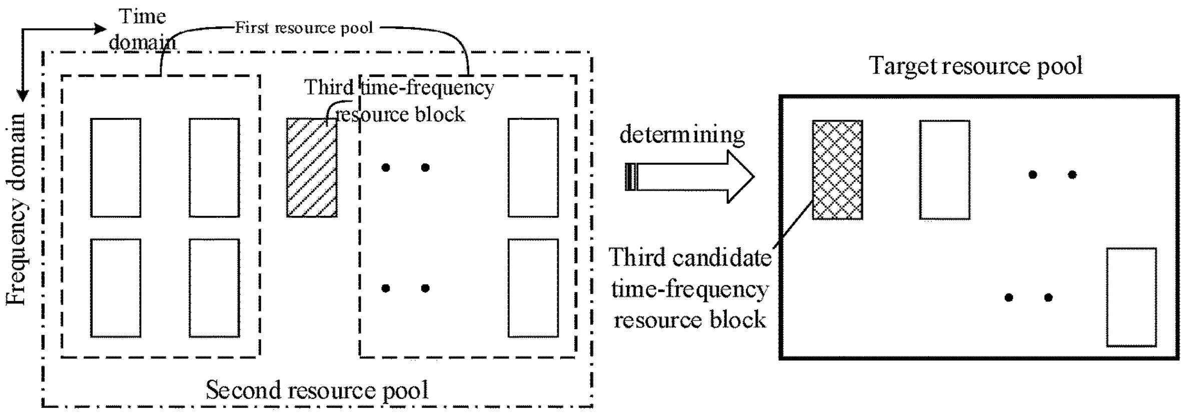
FIG. 8 illustrates a schematic diagram of relations among a first resource pool, a second resource pool, a third time-domain resource block, and a third candidate time-frequency resource block and a target resource pool according to one embodiment of the present application.

Embodiment 8 illustrates a schematic diagram of relations among a first resource pool, a second resource pool, a third time-domain resource block, and a third candidate time-frequency resource block and a target resource pool according to one embodiment of the present application, as shown in FIG. 8. In FIG. 8, the dotted-line box represents a first resource pool in the present application; each rectangle in the dotted-line box represents a time-frequency resource block in the first resource pool; the dot-dashed-line box represents a second resource pool in the present application; the slash-filled rectangle represents a third time-frequency resource block in the present application; the thick-solid-line framed box represents a target resource pool in the present application; the cross-filled rectangle represents a third candidate time-frequency resource block in the present application.

In Embodiment 8, the second resource pool comprises the first resource pool and a third time-frequency resource block, the third time-frequency resource block not belonging to the first resource pool; the third candidate time-frequency resource block is associated with the third time-frequency resource block; the first signaling indicates the first reference resource set, whether the first reference resource set comprises the third candidate time-frequency resource block is used to determine whether the third candidate time-frequency resource block belongs to the target resource pool.

In one embodiment, the second resource pool is used for sidelink transmission.

In one embodiment, the second resource pool comprises all or partial resources in a sidelink resource pool.

In one embodiment, the second resource pool comprises all or partial resources in a sidelink transmission resource pool.

In one embodiment, the second resource pool comprises all or partial resources in a sidelink reception resource pool.

In one embodiment, the second resource pool comprises a PSCCH.

In one embodiment, the second resource pool comprises a PSSCH.

In one embodiment, the second resource pool comprises a PSFCH.

In one embodiment, the second resource pool is used for transmitting an SL RS.

In one embodiment, the second resource pool is comprised of multiple REs.

In one embodiment, any RE among the multiple REs comprised by the second resource pool occupies one multicarrier symbol in time domain, and one subcarrier in frequency domain.

In one embodiment, the second resource pool comprises multiple time-domain resource blocks in time domain, and comprises multiple frequency-domain resource blocks in frequency domain.

In one embodiment, the second resource pool comprises multiple time-frequency resource blocks.

In one embodiment, any time-frequency resource block among the multiple time-frequency resource blocks comprised in the second resource pool occupies a positive integer number of slot(s) in time domain and occupies a positive integer number of consecutive subchannels in frequency domain.

In one embodiment, any time-frequency resource block among the multiple time-frequency resource blocks comprised in the second resource pool occupies a positive integer number of multicarrier symbol(s) in time domain and occupies a positive integer number of consecutive subchannels in frequency domain.

In one embodiment, any time-frequency resource block among the multiple time-frequency resource blocks comprised in the second resource pool occupies a positive integer number of slot(s) in time domain and occupies a positive integer number of consecutive PRBs in frequency domain.

In one embodiment, any time-frequency resource block among the multiple time-frequency resource blocks comprised in the second resource pool occupies a positive integer number of multicarrier symbol(s) in time domain and occupies a positive integer number of consecutive PRBs in frequency domain.

In one embodiment, any time-frequency resource block among the multiple time-frequency resource blocks comprised in the second resource pool comprises a positive integer number of RE(s).

In one embodiment, the multiple time-domain resources comprised in the second resource pool in time domain are pre-configured.

In one embodiment, the multiple time-domain resources comprised in the second resource pool in time domain are configured by a higher-layer signaling.

In one embodiment, the second resource pool is indicated by the third signaling.

In one embodiment, the second resource pool is used to determine the first resource pool.

In one embodiment, the first resource pool comprises time-frequency resource blocks comprised by the second resource pool within a first sensing window.

In one embodiment, the first sensing window comprises multiple time-domain resource blocks.

In one embodiment, the first sensing window is 10 ms.

In one embodiment, the first sensing window is 1000 ms.

In one embodiment, a third time-frequency resource block is a time-frequency resource block among the multiple time-frequency resource blocks comprised in the second resource pool, and the first node does not receive any signal in the third time-frequency resource block, the third time-frequency resource block not belonging to the first resource pool.

In one embodiment, a third time-frequency resource block is a time-frequency resource block among the multiple time-frequency resource blocks comprised in the second resource pool, and the first node drops receiving any signal in the third time-frequency resource block, the third time-frequency resource block not belonging to the first resource pool.

In one embodiment, a third time-frequency resource block is a time-frequency resource block among the multiple time-frequency resource blocks comprised in the second resource pool, and the third time-frequency resource block is not monitored by the first node, the third time-frequency resource block not belonging to the first resource pool.

In one embodiment, a third time-frequency resource block is a time-frequency resource block among the multiple time-frequency resource blocks comprised in the second resource pool, and the first node transmits a signal in a third time-domain resource block, the third time-domain resource block and the third time-frequency resource block being overlapping in time domain, the third time-frequency resource block not belonging to the first resource pool.

In one embodiment, a third time-frequency resource block is a time-frequency resource block among the multiple time-frequency resource blocks comprised in the second resource pool, and the first node drops performing the first channel sensing in the third time-frequency resource block, the third time-frequency resource block not belonging to the first resource pool.

In one embodiment, a third time-frequency resource block is a time-frequency resource block among the multiple time-frequency resource blocks comprised in the second resource pool, the third time-frequency resource block not belonging to the first resource pool, and a third candidate time-frequency resource block being associated with the third time-frequency resource block.

In one embodiment, a given candidate time-frequency resource block in the present application is associated with a given time-frequency resource block in the present application; the given time-frequency resource block comprises the third time-frequency resource block, and the given candidate time-frequency resource block comprises the third candidate time-frequency resource block.

In one embodiment, the first signaling indicates the first reference resource set, the first reference resource set comprising the third candidate time-frequency resource block, the third candidate time-frequency resource block belonging to the target resource pool.

In one embodiment, the first signaling indicates the first reference resource set, with the third candidate time-frequency resource block being a time-frequency resource block in the first reference resource set, the third candidate time-frequency resource block belonging to the target resource pool.

In one embodiment, the first signaling indicates the first reference resource set, with the third candidate time-frequency resource block being different from any time-frequency resource block in the first reference resource set, the third candidate time-frequency resource block belonging to the target resource pool.

In one embodiment, the first signaling indicates the first reference resource set, when the first reference resource set comprises the third candidate time-frequency resource block, the third candidate time-frequency resource block is one of the multiple time-frequency resource blocks comprised in the target resource pool; when the third candidate time-frequency resource block is different from any time-frequency resource block in the first reference resource set, the third candidate time-frequency resource block is different from any time-frequency resource block among the multiple time-frequency resource blocks comprised in the target resource pool.

Embodiment 9

Figure 9:
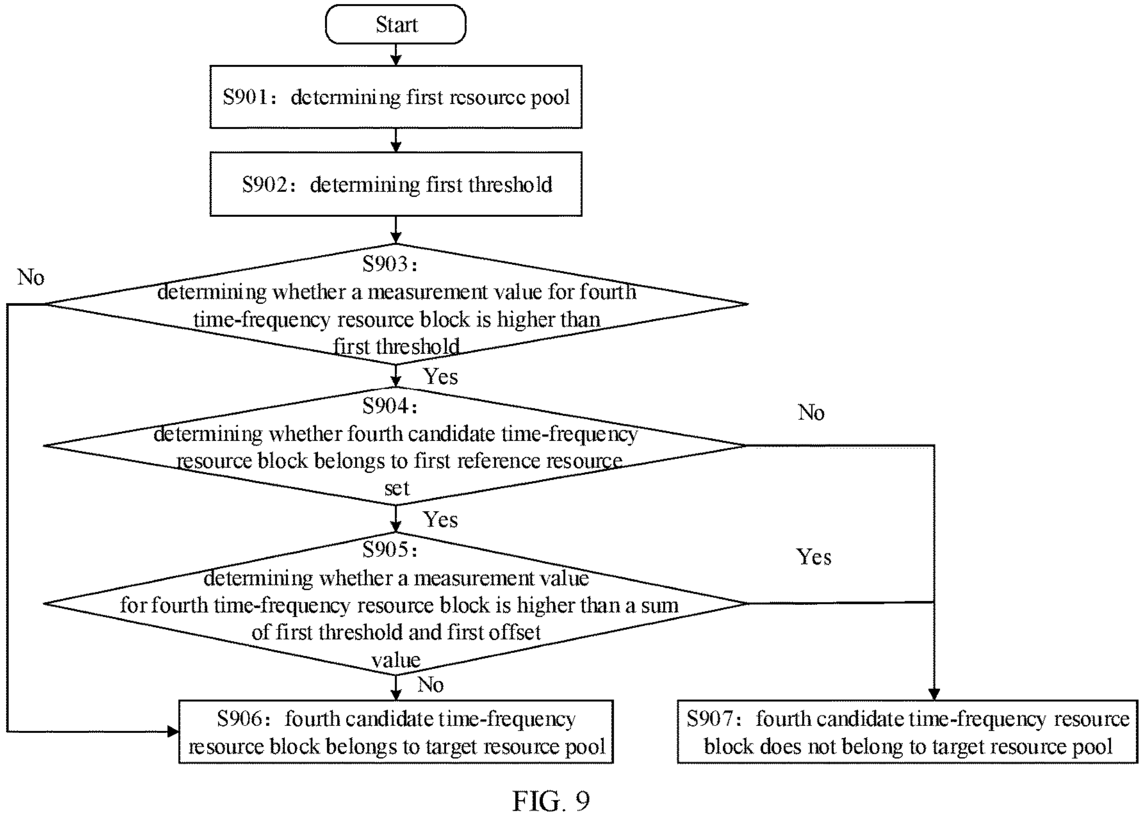
FIG. 9 illustrates a flowchart of determining whether a fourth candidate time-frequency resource block belongs to a target resource pool according to one embodiment of the present application.

Embodiment 9 illustrates a flowchart of determining whether a fourth candidate time-frequency resource block belongs to a target resource pool according to one embodiment of the present application, as shown in FIG. 9. In FIG. 9, determining a first resource pool in step S901; determining a first threshold in step S902; and determining whether a measurement value for a fourth time-frequency resource block is higher than a first threshold in step S903; when the measurement value for the fourth time-frequency resource block is lower than or equal to a first threshold, performing step S906, where a fourth candidate time-frequency resource block belongs to a target resource pool; when the measurement value for the fourth time-frequency resource block is higher than a first threshold, performing step S904 to determine whether a fourth candidate time-frequency resource block belongs to a first reference resource set; when the fourth candidate time-frequency resource block does not belong to the first reference resource set, performing step S907, where a fourth candidate time-frequency resource block does not belong to a target resource pool; when the fourth candidate time-frequency resource block belongs to the first reference resource set, performing step S905 to determine whether a measurement value for the fourth time-frequency resource block is higher than a sum of a first threshold and a first offset value; when the measurement value for the fourth time-frequency resource block is lower than or equal to the sum of a first threshold and a first offset value, performing step S906, where a fourth candidate time-frequency resource block belongs to a target resource pool; when the measurement value for the fourth time-frequency resource block is higher than the sum of a first threshold and a first offset value, performing step S907, where a fourth candidate time-frequency resource block does not belong to a target resource pool.

In Embodiment 9, the first resource pool comprises a fourth time-frequency resource block, a fourth candidate time-frequency resource block being associated with the fourth time-frequency resource block; a measurement value for the fourth time-frequency resource block is higher than a first threshold; the first signaling and a first offset value are used together to determine whether the fourth candidate time-frequency resource block belongs to the target resource pool.

In one embodiment, the fourth time-frequency resource block is a time-frequency resource block among the multiple time-frequency resource blocks comprised in the first resource pool, the fourth candidate time-frequency resource block being associated with the fourth time-frequency resource block.

In one embodiment, a fourth reference signal is transmitted on the fourth time-frequency resource block.

In one embodiment, the fourth time-frequency resource block comprises time-frequency resources occupied by the fourth reference signal.

In one embodiment, a given time-frequency resource block in the present application comprises the fourth time-frequency resource block.

In one embodiment, a given candidate time-frequency resource block in the present application comprises the fourth candidate time-frequency resource block.

In one embodiment, a given reference signal in the present application comprises the fourth reference signal.

In one embodiment, a given candidate time-frequency resource block in the present application is associated with a given time-frequency resource block in the present application; the given time-frequency resource block comprises the fourth time-frequency resource block, and the given candidate time-frequency resource block comprises the fourth candidate time-frequency resource block.

In one embodiment, the phrase of "measuring a given reference signal on a given time-frequency resource block" comprises measuring the fourth reference signal on the fourth time-frequency resource block.

In one embodiment, the measurement for a given time-frequency resource block includes a measurement for a fourth time-frequency resource block in the present application.

In one embodiment, a measurement for a fourth time-frequency resource block comprises measuring the fourth reference signal on the fourth time-frequency resource block.

In one embodiment, the measurement for a given time-frequency resource block includes a measurement for a fourth time-frequency resource block in the present application.

In one embodiment, a measurement for a fourth time-frequency resource block comprises measuring the fourth reference signal on the fourth time-frequency resource block.

In one embodiment, the given reference signal comprises the fourth reference signal in the present application.

In one embodiment, a measurement value for the fourth time-frequency resource block comprises an RSRP of the fourth reference signal measured on the fourth time-frequency resource block.

In one embodiment, a measurement value for the fourth time-frequency resource block comprises an RSSI of the fourth reference signal measured on the fourth time-frequency resource block.

In one embodiment, a measurement value for the fourth time-frequency resource block comprises an RSRQ of the fourth reference signal measured on the fourth time-frequency resource block.

In one embodiment, a measurement value for the fourth time-frequency resource block is measured in dBm.

In one embodiment, a measurement value for the fourth time-frequency resource block is measured in dB.

In one embodiment, a measurement value for the fourth time-frequency resource block is measured in mW.

In one embodiment, a measurement value for the fourth time-frequency resource block is measured in W.

In one embodiment, a fourth signaling is transmitted on the fourth time-frequency resource block.

In one embodiment, a given signaling in the present application includes the fourth signaling.

In one embodiment, the fourth signaling indicates the fourth time-frequency resource block and the first priority.

In one embodiment, the first priority and the second priority are used to determine the first threshold.

In one embodiment, a given threshold in the present application includes the first threshold.

In one embodiment, the measurement value for the fourth time-frequency resource block is higher than a sum of the first threshold and the first offset value, the fourth candidate time-frequency resource block not belonging to the target resource pool.

In one embodiment, the measurement value for the fourth time-frequency resource block is lower than a sum of the first threshold and the first offset value, the fourth candidate time-frequency resource block belonging to the target resource pool.

In one embodiment, the measurement value for the fourth time-frequency resource block is equal to a sum of the first threshold and the first offset value, the fourth candidate time-frequency resource block belonging to the target resource pool.

In one embodiment, the first reference resource set indicated by the first signaling comprises the fourth candidate time-frequency resource block, and a measurement value for the fourth time-frequency resource block is lower than a sum of the first threshold and a first offset value, the fourth candidate time-frequency resource block belonging to the target resource pool.

In one embodiment, the first reference resource set indicated by the first signaling comprises the fourth candidate time-frequency resource block, and a measurement value for the fourth time-frequency resource block is equal to a sum of the first threshold and a first offset value, the fourth candidate time-frequency resource block belonging to the target resource pool.

In one embodiment, the measurement value for the fourth time-frequency resource block is lower than the first threshold, the fourth candidate time-frequency resource block not belonging to the target resource pool.

In one embodiment, the measurement value for the fourth time-frequency resource block is higher than the first threshold, the fourth candidate time-frequency resource block not belonging to the first reference resource set, and the fourth candidate time-frequency resource block not belonging to the target resource pool.

In one embodiment, the measurement value for the fourth time-frequency resource block is higher than the first threshold, the fourth candidate time-frequency resource block belonging to the first reference resource set, but the fourth candidate time-frequency resource block not belonging to the target resource pool.

In one embodiment, the measurement value for the fourth time-frequency resource block is higher than the first threshold, the fourth candidate time-frequency resource block belonging to the first reference resource set, and the fourth candidate time-frequency resource block belonging to the target resource pool.

In one embodiment, the measurement value for the fourth time-frequency resource block is higher than the first threshold, the fourth candidate time-frequency resource block belonging to the first reference resource set, and the measurement value for the fourth time-frequency resource block is higher than a sum of the first threshold and a first offset value, the fourth candidate time-frequency resource block not belonging to the target resource pool.

In one embodiment, the measurement value for the fourth time-frequency resource block is higher than the first threshold, the fourth candidate time-frequency resource block belonging to the first reference resource set, and the measurement value for the fourth time-frequency resource block is lower than a sum of the first threshold and a first offset value, the fourth candidate time-frequency resource block belonging to the target resource pool.

In one embodiment, the measurement value for the fourth time-frequency resource block is higher than the first threshold, the fourth candidate time-frequency resource block belonging to the first reference resource set, and the measurement value for the fourth time-frequency resource block is equal to a sum of the first threshold and a first offset value, the fourth candidate time-frequency resource block belonging to the target resource pool.

In one embodiment, the fourth candidate time-frequency resource block belonging to the first reference resource set means that the fourth candidate time-frequency resource block is one of the positive integer number of time-frequency resource block(s) comprised in the first reference resource set.

In one embodiment, the fourth candidate time-frequency resource block not belonging to the first reference resource set means that the fourth candidate time-frequency resource block is different from any of the positive integer number of time-frequency resource block(s) comprised in the first reference resource set.

In one embodiment, the fourth candidate time-frequency resource block belonging to the target resource pool means that the fourth candidate time-frequency resource block is one of the multiple time-frequency resource blocks comprised in the target resource pool.

In one embodiment, the fourth candidate time-frequency resource block not belonging to the target resource pool means that the fourth candidate time-frequency resource block is different from any of the multiple time-frequency resource blocks comprised in the target resource pool.

In one embodiment, the first offset value is a non-negative number.

In one embodiment, the first offset value is a positive integer.

In one embodiment, the first offset value is measured in dBm.

In one embodiment, the first offset value is measured in dB.

In one embodiment, the first offset value is measured in mW.

In one embodiment, the first offset value is measured in W.

In one embodiment, the first offset value is 2 dB.

In one embodiment, the first offset value is 3 dB.

In one embodiment, the first offset value is pre-configured.

In one embodiment, the first offset value is configured by a higher layer signaling.

Embodiment 10

Figure 10:
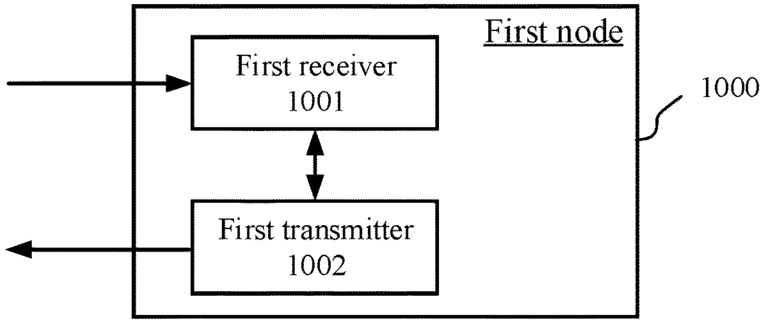
FIG. 10 illustrates a structure block diagram of a processing device used in a first node according to one embodiment of the present application.

Embodiment 10 illustrates a structure block diagram of a processing device used in a first node, as shown in FIG. 10. In Embodiment 10, a processing device 1000 in a first node is comprised of a first receiver 1001 and a first transmitter 1002.

In one embodiment, the first receiver 1001 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1002 comprises at least one of the antenna 452, the transmitter/receiver 454, the multi-antenna transmitting processor 457, the transmitting processor 468, the controller/processor 459, the memory 460 or the data source 467 in FIG. 4 of the present application.

In Embodiment 10, the first receiver 1001 receives a first signaling; the first receiver 1001 performs a first channel sensing in a first resource pool; the first receiver 1001 determines a target resource pool; the first transmitter 1002 selects a target time-frequency resource block in the target resource pool; the first transmitter 1002 transmits a second signaling on a target time-frequency resource block; the first signaling indicates a first reference resource set, the first reference resource set comprising at least one time-frequency resource block; the first channel sensing is used to determine the target resource pool; a first candidate time-frequency resource block is a time-frequency resource block in the target resource pool; whether the first candidate time-frequency resource block belongs to the first reference resource set is used to determine whether the first candidate time-frequency resource block is chosen as the target time-frequency resource block; the second signaling is used to indicate the target time-frequency resource block.

In one embodiment, the first candidate time-frequency resource block is associated with a first time-frequency resource block; the first resource pool comprises the first time-frequency resource block; a measurement value for the first time-frequency resource block and whether the first candidate time-frequency resource block belongs to the first reference resource set are used together to determine whether the first candidate time-frequency resource block is chosen as the target time-frequency resource block.

In one embodiment, the first receiver 1001 receives a third signaling; the third signaling indicates a second resource pool, the second resource pool comprising a third time-frequency resource block, a third candidate time-frequency resource block being associated with the third time-frequency resource block; the second resource pool is used to determine the first resource pool, the first resource pool not comprising the third time-frequency resource block; the first signaling is used to determine whether the third candidate time-frequency resource block belongs to the target resource pool.

In one embodiment, the first resource pool comprises a fourth time-frequency resource block, a fourth candidate time-frequency resource block being associated with the fourth time-frequency resource block; a measurement value for the fourth time-frequency resource block is higher than a first threshold; the first signaling and a first offset value are used together to determine whether the fourth candidate time-frequency resource block belongs to the target resource pool.

In one embodiment, the first node 1000 is a UE.

In one embodiment, the first node 1000 is a relay node.

In one embodiment, the first node 1000 is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:

a first receiver, configured to receive a first signaling, perform a first channel sensing in a first resource pool, and determine a target resource pool; and a first transmitter, configured to select a target time-frequency resource block in the target resource pool, and transmit a second signaling on the target time-frequency resource block;

wherein the first signaling indicates a first reference resource set, the first reference resource set comprising at least one time-frequency resource block; the first channel sensing is used to determine the target resource pool; a first candidate time-frequency resource block is a time-frequency resource block in the target resource pool; the first candidate time-frequency resource block is associated with a first time-frequency resource block; a measurement value for the first time-frequency resource block and whether the first candidate time-frequency resource block belongs to the first reference resource set are used together to determine whether the first candidate time-frequency resource block is chosen as the target time-frequency resource block; the second signaling is used to indicate the target time-frequency resource block; and the second signaling is configured for reception by a second node on the target time-frequency resource block.

2. The first node according to claim 1, wherein the first reference resource set indicated by the first signaling and the first channel sensing are used together to determine the target resource pool.

3. The first node according to claim 1, wherein the first resource pool comprises the first time-frequency resource block.

4. The first node according to claim 3, wherein when the first candidate time-frequency resource block belongs to the first reference resource set, whether a measurement value for the first time-frequency resource block is higher than a measurement value for a second time-frequency resource block is used to determine whether the first candidate time-frequency resource block is chosen as the target time-frequency resource block; and when the first candidate time-frequency resource block does not belong to the first reference resource set, the first candidate time-frequency resource block is not chosen as the target time-frequency resource block.

5. The first node according to claim 4, wherein the first candidate time-frequency resource block belongs to the first reference resource set; when a measurement value for the first time-frequency resource block is lower than or equal to a measurement value for the second time-frequency resource block, the first candidate time-frequency resource block is chosen as the target time-frequency resource block; and when a measurement value for the first time-frequency resource block is higher than a measurement value for the second time-frequency resource block, the first candidate time-frequency resource block is not chosen as the target time-frequency resource block.

6. The first node according to claim 1, wherein:

the first receiver is further configured to receive a third signaling; and the third signaling indicates a second resource pool, the second resource pool comprising a third time-frequency resource block, a third candidate time-frequency resource block being associated with the third time-frequency resource block; the second resource pool is used to determine the first resource pool, the first resource pool not comprising the third time-frequency resource block; and the first signaling is used to determine whether the third candidate time-frequency resource block belongs to the target resource pool.

7. The first node according to claim 1, wherein the first resource pool comprises a fourth time-frequency resource block, a fourth candidate time-frequency resource block being associated with the fourth time-frequency resource block; a measurement value for the fourth time-frequency resource block is higher than a first threshold; and the first signaling and a first offset value are used together to determine whether the fourth candidate time-frequency resource block belongs to the target resource pool.

8. The first node according to claim 7, wherein when the measurement value for the fourth time-frequency resource block is lower than or equal to a sum of the first threshold and the first offset value, the fourth candidate time-frequency resource block belongs to the target resource pool; and when the measurement value for the fourth time-frequency resource block is higher than a sum of the first threshold and the first offset value, the fourth candidate time-frequency resource block does not belong to the target resource pool.

9. The first node according to claim 1, wherein the first reference resource set is time-frequency resources recommended by a transmitter transmitting the first signaling to the first node for transmitting.

10. The first node according to claim 1, wherein the first resource pool comprises a fourth time-frequency resource block, a fourth candidate time-frequency resource block being associated with the fourth time-frequency resource block; when the fourth candidate time-frequency resource block does not belong to the first reference resource set, the fourth candidate time-frequency resource block does not belong to the target resource pool; and when the fourth candidate time-frequency resource block belongs to the first reference resource set, whether a measurement value for the fourth time-frequency resource block is higher than a sum of a first threshold and a first offset value is used to determine whether the fourth candidate time-frequency resource block belongs to the target resource pool.

11. The first node according to claim 10, wherein when the measurement value for the fourth time-frequency resource block is lower than or equal to a sum of the first threshold and the first offset value, the fourth candidate time-frequency resource block belongs to the target resource pool; and when the measurement value for the fourth time-frequency resource block is higher than a sum of the first threshold and the first offset value, the fourth candidate time-frequency resource block does not belong to the target resource pool.

12. A method in a first node for wireless communications, comprising:

receiving a first signaling, performing a first channel sensing in a first resource pool, and determining a target resource pool; and selecting a target time-frequency resource block in the target resource pool, and transmitting a second signaling on the target time-frequency resource block;

wherein the first signaling indicates a first reference resource set, the first reference resource set comprising at least one time-frequency resource block; the first channel sensing is used to determine the target resource pool; a first candidate time-frequency resource block is a time-frequency resource block in the target resource pool; the first candidate time-frequency resource block is associated with a first time-frequency resource block; a measurement value for the first time-frequency resource block and whether the first candidate time-frequency resource block belongs to the first reference resource set are used together to determine whether the first candidate time-frequency resource block is chosen as the target time-frequency resource block; the second signaling is used to indicate the target time-frequency resource block; and the second signaling is configured for reception by a second node on the target time-frequency resource block.

13. The method according to claim 12, wherein the first reference resource set indicated by the first signaling and the first channel sensing are used together to determine the target resource pool.

14. The method according to claim 12, wherein the first resource pool comprises the first time-frequency resource block.

15. The method in the first node according to claim 14, wherein when the first candidate time-frequency resource block belongs to the first reference resource set, whether a measurement value for the first time-frequency resource block is higher than a measurement value for a second time-frequency resource block is used to determine whether the first candidate time-frequency resource block is chosen as the target time-frequency resource block; and when the first candidate time-frequency resource block does not belong to the first reference resource set, the first candidate time-frequency resource block is not chosen as the target time-frequency resource block.

16. The method in the first node according to claim 15, wherein the first candidate time-frequency resource block belongs to the first reference resource set; when a measurement value for the first time-frequency resource block is lower than or equal to a measurement value for the second time-frequency resource block, the first candidate time-frequency resource block is chosen as the target time-frequency resource block; and when a measurement value for the first time-frequency resource block is higher than a measurement value for the second time-frequency resource block, the first candidate time-frequency resource block is not chosen as the target time-frequency resource block.

17. The method according to claim 12, comprising:

receiving a third signaling;

wherein the third signaling indicates a second resource pool, the second resource pool comprising a third time-frequency resource block, a third candidate time-frequency resource block being associated with the third time-frequency resource block; the second resource pool is used to determine the first resource pool, the first resource pool not comprising the third time-frequency resource block; and the first signaling is used to determine whether the third candidate time-frequency resource block belongs to the target resource pool.

18. The method according to claim 12, wherein the first resource pool comprises a fourth time-frequency resource block, a fourth candidate time-frequency resource block being associated with the fourth time-frequency resource block; a measurement value for the fourth time-frequency resource block is higher than a first threshold; and the first signaling and a first offset value are used together to determine whether the fourth candidate time-frequency resource block belongs to the target resource pool.

19. The method in the first node according to claim 12, wherein the first reference resource set is time-frequency resources recommended by a transmitter transmitting the first signaling to the first node for transmitting.

20. A second node for wireless communications, comprising:

a second transmitter, configured to transmit a first signaling used by a first node to perform a first channel sensing to determine a target resource pool; and a second receiver, configured to receive a second signaling on a target time-frequency resource block, the second signaling being configured for reception by said second receiver;

wherein the first signaling is used to indicate a first reference resource set, the first reference resource set comprising at least one time-frequency resource block;

a measurement value for a first time-frequency resource block associated with a first candidate time-frequency resource block that is a time-frequency resource block in a target resource pool that includes the target time-frequency resource block and whether the first reference resource set comprises the first candidate time-frequency resource block is used by a receiver receiving the first signaling to determine whether the first candidate time-frequency resource block is chosen as the target time-frequency resource block; the second signaling indicates the target time-frequency resource block.

* * * * *